US005774261A

United States Patent [19]
Omori et al.

[11] Patent Number: 5,774,261
[45] Date of Patent: *Jun. 30, 1998

[54] IMAGE DISPLAY SYSTEM

[75] Inventors: Shigeru Omori; Jun Suzuki, both of Nakai-machi, Japan

[73] Assignee: Terumo Kabushiki Kaisha, Tokyo, Japan

[*] Notice: The term of this patent shall not extend beyond the expiration date of Pat. No. 5,568,314.

[21] Appl. No.: 309,504

[22] Filed: Sep. 23, 1994

[30] Foreign Application Priority Data

| Nov. 19, 1993 | [JP] | Japan | 5-290950 |
| Dec. 3, 1993 | [JP] | Japan | 5-304384 |
| Dec. 3, 1993 | [JP] | Japan | 5-304457 |
| Dec. 3, 1993 | [JP] | Japan | 5-304458 |
| Dec. 3, 1993 | [JP] | Japan | 5-304459 |
| Dec. 3, 1993 | [JP] | Japan | 5-304467 |

[51] Int. Cl.$^6$ ............... G02B 27/22; H04N 13/04
[52] U.S. Cl. ............... 359/464; 359/466; 359/462; 348/51; 348/52
[58] Field of Search ............... 359/462, 463, 359/464, 465, 466, 467, 477, 478, 583; 348/42, 51, 52, 54; 345/87

[56] References Cited

U.S. PATENT DOCUMENTS

| 3,128,339 | 4/1964 | Wupper | 348/52 |
| 4,385,316 | 5/1983 | Yanagisawa | 348/44 |
| 4,535,354 | 8/1985 | Rickert | 348/52 |
| 4,641,178 | 2/1987 | Street | 348/57 |
| 4,647,966 | 3/1987 | Phillips et al. | |
| 4,649,425 | 3/1987 | Pund | 358/88 |
| 4,717,949 | 1/1988 | Eichenlaub | 348/54 |
| 4,829,365 | 5/1989 | Eichenlaub | 348/54 |
| 4,870,600 | 9/1989 | Hiraoka | |
| 4,890,902 | 1/1990 | Doane et al. | 349/94 |

(List continued on next page.)

FOREIGN PATENT DOCUMENTS

| 0 505 998 | 9/1992 | European Pat. Off. . |
| 0 576 106 | 12/1993 | European Pat. Off. . |
| 0 595 023A1 | 5/1994 | European Pat. Off. . |
| 0 601 308 | 6/1994 | European Pat. Off. . |
| 0 602 934 | 6/1994 | European Pat. Off. . |
| 0 602 934 A2 | 6/1994 | European Pat. Off. . |

(List continued on next page.)

OTHER PUBLICATIONS

K.E. Jachimowicz, et al., "Stereoscopic (3-D) projection display using polarized color multiplexing," Optical Engineering, vol. 29, Aug. 1990.

K. Yamamoto, et al., "Automatic Viewing Range Tracing Method For Communication Equipment", IEEE Transactions on Consumer Electronics, Aug. 1991, No. 3, vol. 37, pp. 424–431.

J.R. Moore et al., "The Implementation of a Multi-view Autostereoscopic Display," *Image Technology*, (Journal of the BKSTS), vol. 75, No. 1, Jan. 1993, pp. 6–11.

Primary Examiner—Paul M. Dzierzynski
Assistant Examiner—Audrey Chang
Attorney, Agent, or Firm—Burns, Doane, Swecker & Mathis, LLP

[57] ABSTRACT

An image display system for providing images such that a right eye and a left eye of an observer see different images, respectively. The image display system includes: a camera for taking a picture of said observer and then outputting an image of the observer; a pair of liquid crystal display devices transparent to light; an image generation device for generating a back-light image based on an image output signal provided by the camera; a pair of CRT devices for displaying a back-light image generated by the image generation device to illuminate the pair of liquid crystal display devices from their back sides; a mirror for combining images present on the pair of liquid crystal display devices into one image; and optical elements for giving directivity to back-light emitted by the pair of back-lighting devices so that one of the pair of CRT devices provides back-light illumination for the right eye and the other one of the pair of CRT devices provides back-light illumination for the left eye.

28 Claims, 27 Drawing Sheets

U.S. PATENT DOCUMENTS

| | | | |
|---|---|---|---|
| 4,922,336 | 5/1990 | Morton | 348/51 |
| 4,987,487 | 1/1991 | Ichinose et al. | 348/59 |
| 5,008,658 | 4/1991 | Russay et al. | 345/87 |
| 5,032,912 | 7/1991 | Sakariassen | 348/52 |
| 5,059,957 | 10/1991 | Todoriki et al. | 345/7 |
| 5,132,839 | 7/1992 | Travis | 359/462 |
| 5,162,785 | 11/1992 | Fagard | 345/87 |
| 5,311,220 | 5/1994 | Eichenlaub | 348/55 |
| 5,315,377 | 5/1994 | Isono et al. | 348/51 |
| 5,365,370 | 11/1994 | Hudgins | 359/464 |
| 5,408,264 | 4/1995 | Kurata et al. | 348/51 |
| 5,421,589 | 6/1995 | Monroe | 273/437 |
| 5,430,474 | 7/1995 | Hines | 348/42 |
| 5,430,809 | 7/1995 | Tomitaka | 382/173 |
| 5,457,574 | 10/1995 | Eichenlaub | 359/619 |
| 5,459,605 | 10/1995 | Kempf | 359/462 |
| 5,494,483 | 2/1996 | Adair | 600/111 |
| 5,499,303 | 3/1996 | Hundt et al. | 382/100 |
| 5,568,314 | 10/1996 | Omori et al. | 359/464 |

FOREIGN PATENT DOCUMENTS

| | | | |
|---|---|---|---|
| 41 02 895C1 | 1/1992 | Germany . | |
| 93 00 765 | 5/1993 | Germany . | |
| 63-12777 | 5/1988 | Japan . | |
| 63 194497 | 8/1988 | Japan . | |
| 5-22722 | 1/1993 | Japan . | |
| 2 111 798A | 7/1983 | United Kingdom . | |
| 2 206 763 | 1/1989 | United Kingdom . | |
| WO8302169 | 6/1983 | WIPO | 359/462 |
| WO 93/19394 | 9/1993 | WIPO . | |

F I G. 4
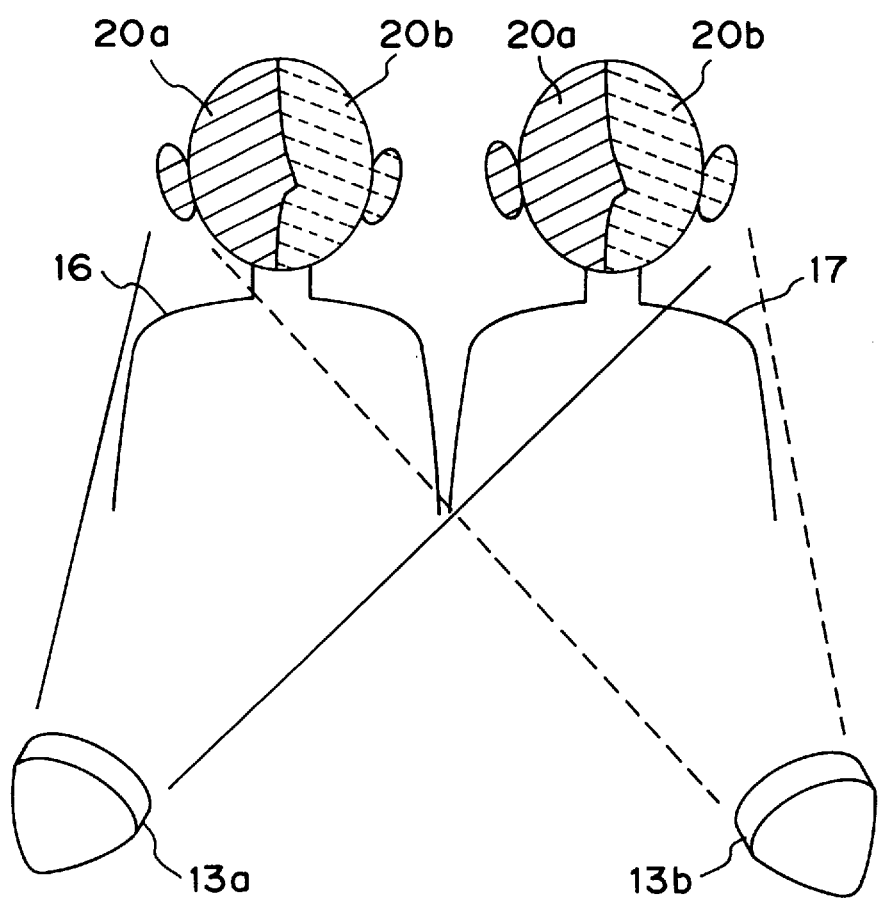

FIG. 7
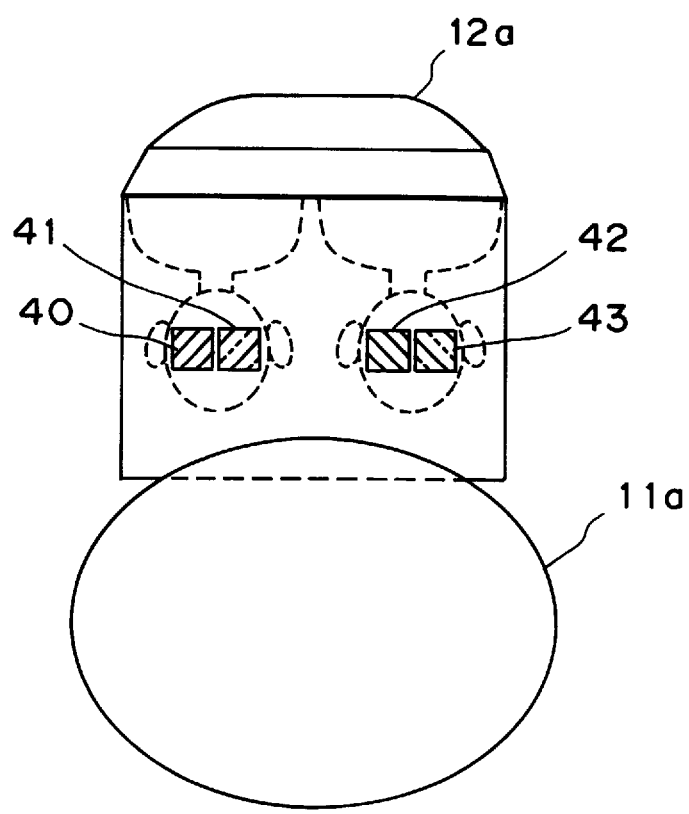
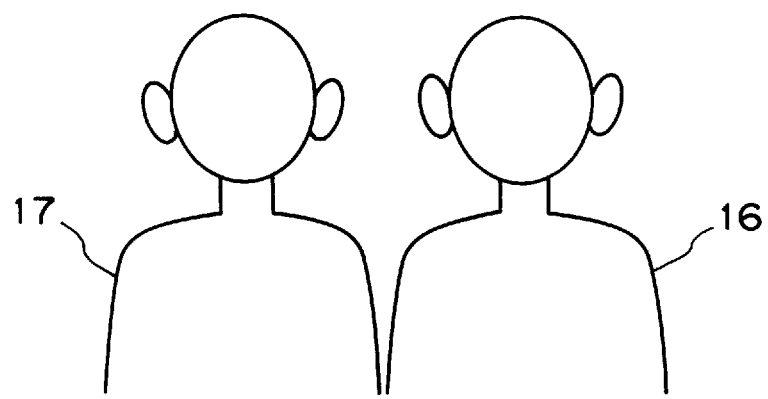

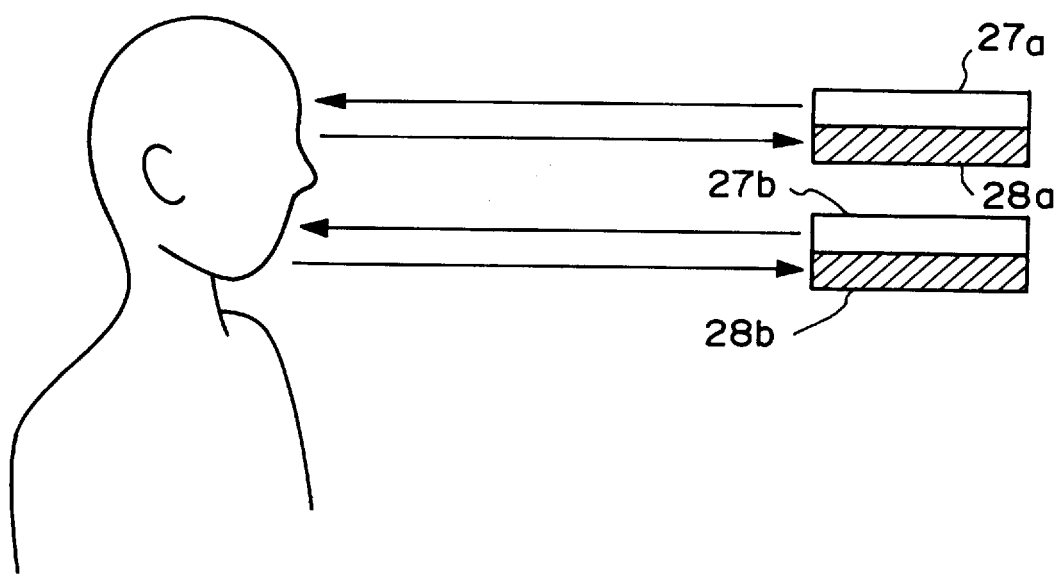
F I G. 10

FIG. 13
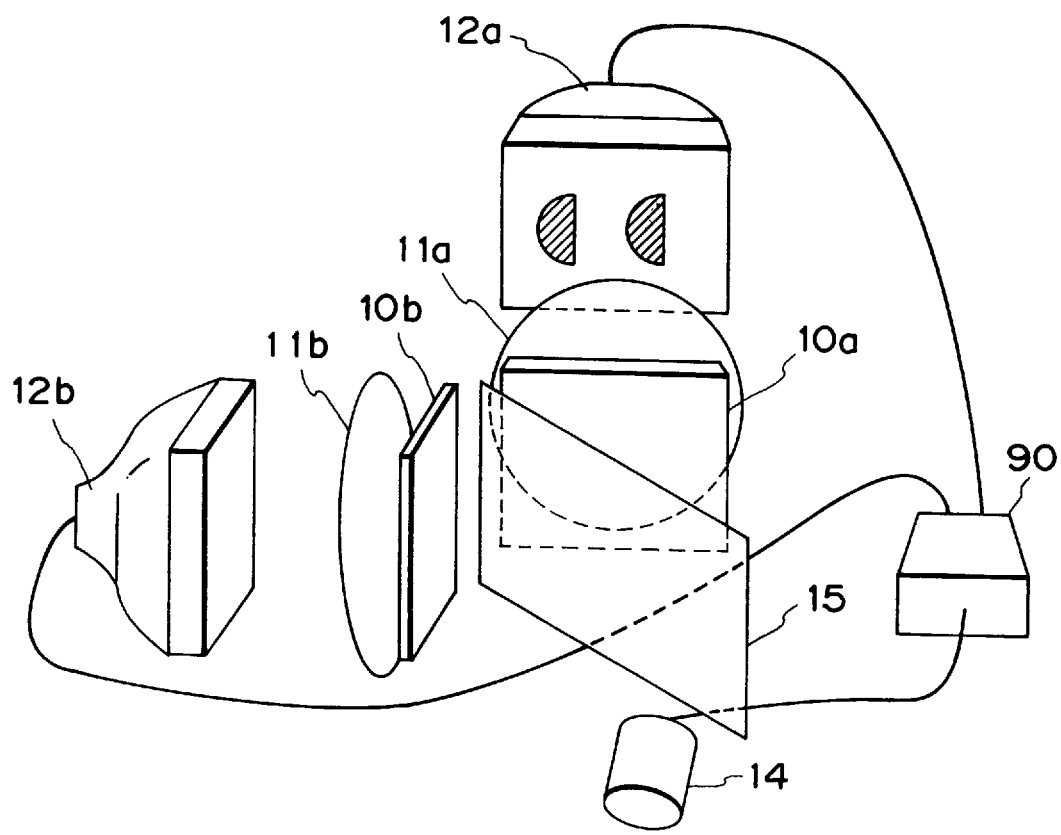
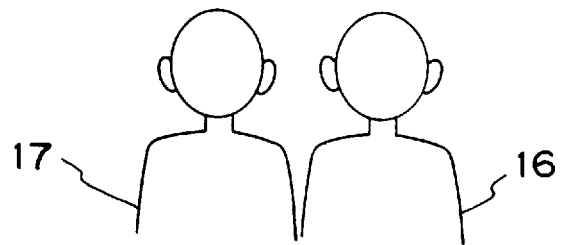

IMAGE DISPLAY SYSTEM

BACKGROUND OF THE INVENTION

1. Field of the Invention

The present invention relates to a display system for displaying an image, and more particularly to a display system for displaying a stereoscopic image for industrial, medical, or domestic use.

2. Description of the Related Art

In a conventional stereoscopic display system, an observer wears glasses for separating right and left target images from each other whereby right and left eyes of the observer can selectively see the right and left target images, respectively, which are displayed on an image screen in a time-division fashion. In another conventional technique, a lenticular plate is attached to an image screen so that the lenticular plate can separate right and left images from each other and thus right and left eyes of the observer can selectively see the right and left target images, respectively.

FIG. 1 illustrates an example of the configuration of the above-described conventional stereoscopic-image display system, which includes glasses 60 capable of separating right and left images from each other, liquid crystal shutters 61a and 61b, a synchronous circuit 62, and color CRT 63 serving as an image display device.

The above first example of a stereoscopic-image display system having such a configuration operates as follows. The color CRT 63 displays target images wherein images for right and left eyes are displayed alternately in a time-division fashion. Under the control of the synchronous circuit 62, the liquid crystal shutter 61a of the glasses 60 is opened and thus become transparent only when a target image for the right eye is displayed, and the liquid crystal shutter 61b is opened and become transparent only when a target image for the left eye is displayed. As a result, an observer wearing the glasses 60 can observe a target image for the right eye with his or her right eye, and a target image for the left eye with the left eye. In this way, stereoscopic vision is provided.

FIG. 2 illustrates the configuration of the second example of a conventional stereoscopic-image display system, which includes a lenticular plate 71 having a large number of stripe-shaped cylindrical lenses and a color CRT 72 serving as an image display device.

This second example of stereoscopic-image display system having such a configuration operates as follows. The color CRT 72 displays simultaneously both target images for right and left eyes such that images for right and left eyes are displayed alternately on each half-width stripe of the lenticular plate 71. The right eye of an observer sees only the target image for the right eye displayed on the above-described slit-shaped zones through corresponding cylindrical lenses of the lenticular plate 71, and the left eye sees only the target image for the left eye displayed on the slit-shaped zones, whereby stereoscopic vision is obtained.

In the first example of the conventional stereoscopic-image display system, however, an observer has to wear troublesome and uncomfortable glasses which separately provide target images to right and left eyes of the observer. Another problem in observing target images using this technique is flicker due to the switching between the target images for right and left eyes.

In the second example of the conventional stereoscopic-image display system, since a stereoscopic image is observed via stripe-shaped lenses, stereoscopic vision can be obtained only when an observer is in a limited narrow area. If the observer moves, degradation occurs in the image. Besides, a number of observers cannot observe an image who are at various positions. Furthermore, image processing is required to provide a stripe-shaped image, which needs an expensive apparatus.

In medical applications, when an endoscopic operation is done, an operator observes a plane image of the inside of a patient's abdominal cavity displayed on a monitor via an endoscope. However, the monitored image of the inside of the abdominal cavity has no characteristic features because the entire abdominal cavity has a single color, and thus it is difficult to give a perspective vision. This causes a long operation time, and results in heavy loads to both operator and patient. On the other hand, when a conventional stereoscopic-image display system of the above-described first or second type is used in the operation, there are serious problems in practical use such as uncomfortable glasses for separating right and left images, flicker of an image, and limitation in movement of an observer.

SUMMARY OF THE INVENTION

It is an object of the present invention to solve the above-described problems.

More specifically, it is an object of the present invention to provide an image display system which has no flicker in an image and which can provide different images to right and left eyes of an observer without using glasses for separating a right-eye image and left-eye image from each other.

To achieve the above objects, the present invention provides an image display system for providing images such that a right eye and a left eye of an observer see different images, respectively, the image display system comprising:

a pair of spatial modulation devices transparent to light;

a pair of back-lighting devices for illuminating the pair of spatial modulation devices from their back sides;

composing means for combining images present on the pair of spatial modulation devices into one image; and optical elements for giving directivity to back-light emitted by the pair of back-lighting devices so that one of the pair of back-lighting devices provides back-light illumination of the spatial modulation device for the right eye and the other one of the pair of back-lighting devices provides back-light illumination of the spatial modulation device for the left eye.

In the image display system constructed in the above-described manner, an image (an image to be observed by a right eye, for example) displayed on one of the pair of spatial modulation devices is illuminated with the (right) back-lighting device from the back side so that the light associated with this image reaches only the right eye of an observer via the directional optical element. Thus, the observer (the right eye of the observer) sees the image (the image for the right eye) displayed on one of the pair of spatial modulation devices via the light emitted by the back-lighting device. At this time, since the portion of the (left) back-lighting device corresponding to right-side face area does not emit light, the image for the left eye cannot be seen by the right eye of the observer. On the other hand, an image (an image to be observed by the left eye) displayed on the other one of spatial modulation devices is illuminated with the (left) back-lighting device from the back side, and the left eye of the observer receives the light associated with this image via the directional optical element. At this time, since the portion of the (right) back-lighting device corresponding to left-side face area does not emit light, the image for the right eye cannot be seen by the left eye of the observer.

In an aspect of the present invention, the pair of back-lighting devices are each disposed outside the focal length of the corresponding optical elements. Because the back-lighting devices are disposed outside the focal lengths, clear images of the back-lighting devices are not formed in eyes of the observer and thus the back-lighting devices simply act as light sources.

In another aspect of the present invention, the above-described optical elements are a pair of lenses disposed between the pair of spatial modulation devices and the pair of back-lighting devices, respectively. Convex lenses, Fresnel lenses or concave mirrors may be employed here as the above-described pair of lenses.

In another aspect of the present invention, the pair of spatial modulation devices are a pair of liquid crystal display devices or a pair of films transparent to light. Liquid crystal display devices and films can pass light. An observer observes images present on the surfaces of the liquid crystal display devices or films via transmitted light.

In another aspect of the present invention, a half mirror or prisms can be employed as the composing means.

In another aspect of the present invention, image signals provided by an endoscope device are displayed on each of the pair of spatial modulation devices.

In another aspect of the present invention, the pair of back-lighting devices are display devices which display images with two-level gradation having a threshold value equal to predetermined brightness. This arrangement prevents overlapping (crosstalk) between images for right and left eyes.

It is another object of the present invention to provide an image display system which provides images with no flicker to a large number of observers at the same time wherein right and left eyes of each observer see different images without wearing glasses for separating right and left images from each other regardless of positions occupied by observers.

To achieve the above objects, the present invention provides an image display system for providing images such that right eyes and left eyes of observers see different images, respectively, the image display system comprising:

position detecting means for detecting observing positions of the observers;

a pair of spatial modulation devices transparent to light;

a pair of back-lighting devices which display back-light images for illuminating the pair of spatial modulation devices from their back sides;

control means for controlling positions of back-light images displayed on the pair of back-lighting devices so that the positions of back-light images correspond to the detected positions of the observers;

composing means for combining images present on the pair of spatial modulation devices into one image; and optical elements for giving directivity to back-light emitted by the pair of back-lighting devices so that one of the pair of back-lighting devices provides back-light illumination of the spatial modulation device for right eyes and the other one of the pair of back-lighting devices provides back-light illumination of the spatial modulation device for left eyes.

In this image display system, the back-light images are displayed on the pair of back-lighting devices at positions corresponding to the observer's positions detected by the position detecting means, and thus the observers can see images displayed on the pair of spatial modulation devices illuminated with the back-light images displayed on the back-lighting devices acting as illuminating light sources. With this arrangement, even if observers move, and/or if there are a large number of observers, the back-light images are always displayed at positions corresponding to the positions occupied by the observers. Thus, in this image display system of the present invention, stereoscopic vision with no flicker is provided to a large number of observers at the same time without wearing glasses for separating right and left images from each other regardless of positions occupied by observers.

In another aspect of the present invention, the position detecting means detects the positions of the observers by generating ultrasonic waves toward the observers and detecting their echo signals. In particular, it is possible to obtain selectivity by using ultrasonic waves having different frequencies.

In another aspect of the present invention, the position detecting means detects the positions of the observers by detecting a infrared ray radiated by the observer. In particular, it is possible to obtain selectivity by using infrared rays having different wavelengths.

In another aspect of the present invention, the position detecting means detects the positions of the observers by detecting magnetism arising from the observer. To achieve the objects described earlier, the present invention also provides an image display system for providing images such that a right eye and left eye of an observer see different images, respectively, the image display system comprising:

picture-taking means for taking a picture of the observer and then outputting an image of the observer;

a pair of spatial modulation devices transparent to light;

back-light image generation means for generating a back-light image based on an image output signal received from the picture-taking means;

a pair of back-lighting devices which receive an output signal associated with the back-light image generated by the back-light image generation means and displays the back-light image to illuminate the pair of spatial modulation devices from their back sides;

composing means for combining images present on the pair of spatial modulation devices into one image; and optical elements for giving directivity to back-light emitted by the pair of back-lighting devices so that one of the pair of back-lighting devices provides back-light illumination of the spatial modulation device for the right eye and the other one of the pair of back-lighting devices provides back-light illumination of the spatial modulation device for the left eye.

In the display system constructed in the above-described manner, an image of the observer taken by the picture-taking means indicates the position of the observer. The back-light images are generated from the image of the observer, and displayed on the pair of back-lighting devices, and thus the observer can see images displayed on the pair of spatial modulation devices illuminated with the back-light images displayed on the back-lighting devices acting as illuminating light sources. With this arrangement, even if an observer moves, and/or if there are a large number of observers, the back-light images are always displayed at positions corresponding to the positions occupied by the observers. Thus, in this image display system of the present invention, stereoscopic vision with no flicker is provided to a large number of observers at the same time without wearing glasses for separating right and left images from each other regardless of positions occupied by observers.

In another aspect of the present invention, the picture-taking means takes a picture of an observer.

In another aspect of the present invention, the picture-taking means separates an image of a left-side face area and an image of right-side face area from the image of the observer's face, and then displays the image of the left-side face area and the image of right-side face area on the pair of back-lighting devices, respectively.

In another aspect of the present invention, a right-side face area and a left-side face area are illuminated with light having different wavelengths, respectively, and a pair of cameras take a picture of said observer's face in such a manner that each said camera selectively takes a picture in response to light having a corresponding wavelength.

In the display system according to another aspect of the present invention, there is further provided image processing means for processing the image of the observer taken by said picture-taking means in such a manner that the contour and/or the centroid of the face area of the image of the observer are detected and then the pair of back-light images are generated on the basis of the detected contour and/or centroid.

In another aspect of the present invention, image processing is performed to determine the difference between a pair of image signals associated with the observer obtained via the pair of cameras, thereby removing an unnecessary information such as a background image from the image of the observer.

In another aspect of the present invention, the pair of illuminating apparatus are fixed to the observer so that the pair of illuminating apparatus move following the movement of the head of the observer.

In another aspect of the present invention, the pair of cameras are each provided with a wavelength filter which selectively passes light emitted by the pair of illuminating apparatus.

In another aspect of the present invention, the picture-taking means includes: a plurality of camera means having different sensitivity characteristics; and a plurality of illumination means having characteristics corresponding to the sensitivity characteristics of the plurality of camera means. The plurality of camera means and the plurality of illumination means are disposed in front of a plurality of observers in such a manner that these means are distributed in the direction from the front to the back of the plurality of observers. Since the plurality of illumination means and said plurality of camera means are distributed in the direction from the front to the back of a plurality of observers, images can be displayed regardless of forward or backward movement of observers and regardless of positions occupied by the plurality of observers.

In another aspect of the present invention, the plurality of illumination means and the plurality of camera means are distributed in the direction from the left to the right as well as in the direction from the front to the back of the plurality of observers.

In another aspect of the present invention, positions of bright points associated with an image of an observer are detected and then the pair of back-light images are generated on the basis of the detected positions of bright points.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a schematic diagram illustrating the operation of the first embodiment of the stereoscopic-image display system according to the present invention;

FIG. 7 is a schematic diagram illustrating the operation of the first embodiment of the stereoscopic-image display system according to the present invention;

FIG. 10 is a schematic diagram illustrating the principle of the third embodiment;

FIG. 13 is a schematic diagram illustrating a fifth embodiment of a stereoscopic-image display system according to the present invention;

DETAILED DESCRIPTION OF THE PREFERRED EMBODIMENTS

Referring to accompanying drawings, display systems for providing a stereoscopic image according to the present invention will be described below.

First Embodiment

Figure 1:
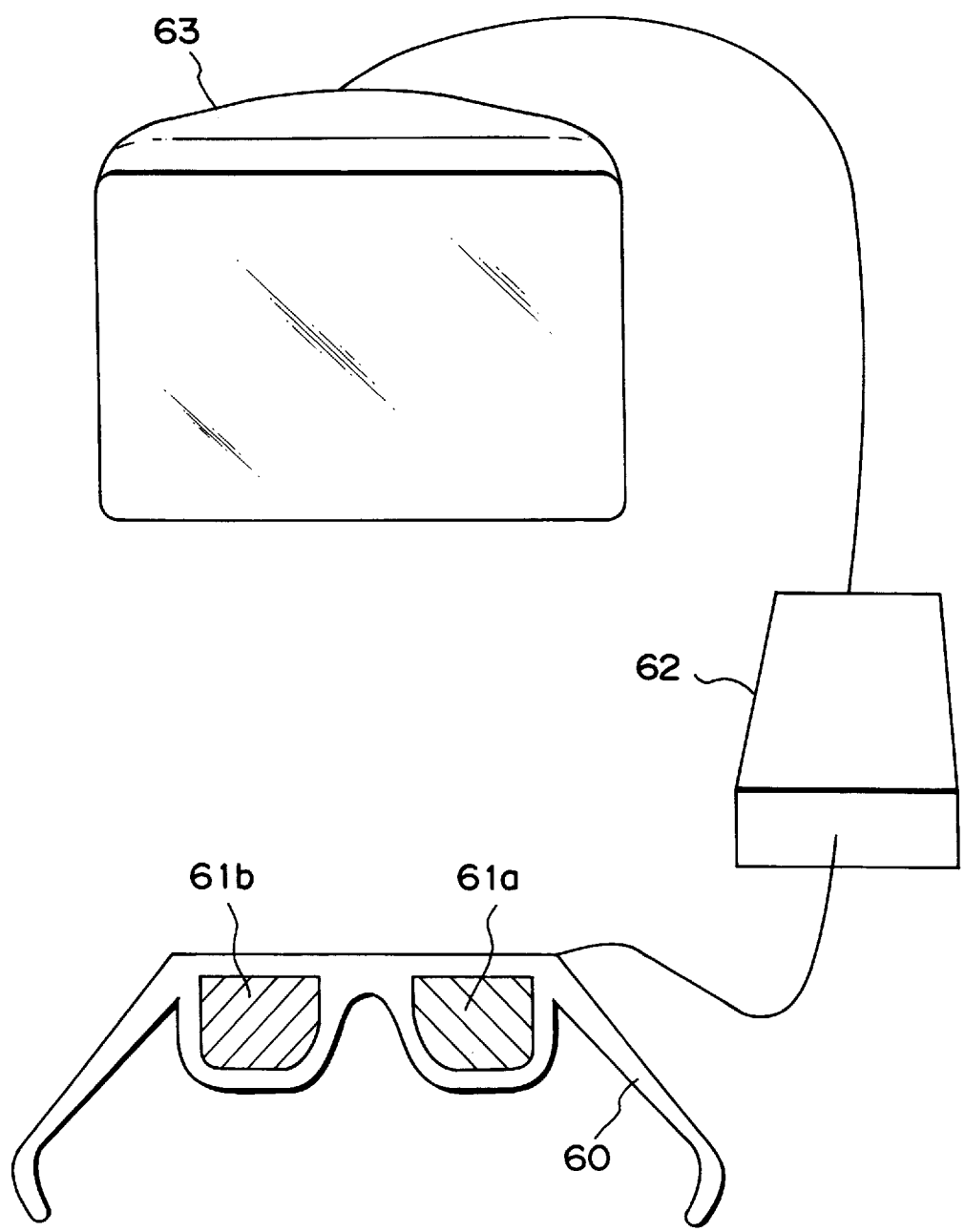
FIG. 1 is a schematic diagram illustrating a first example of a conventional stereoscopic-image display system.
Figure 2:
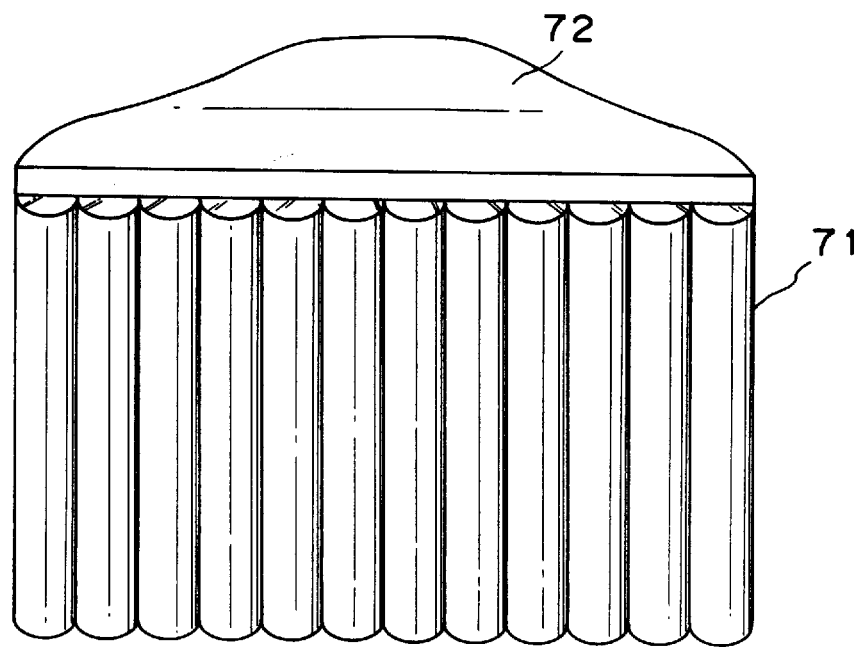
FIG. 2 is a schematic diagram illustrating a second example of a conventional stereoscopic-image display system.
Figure 3:
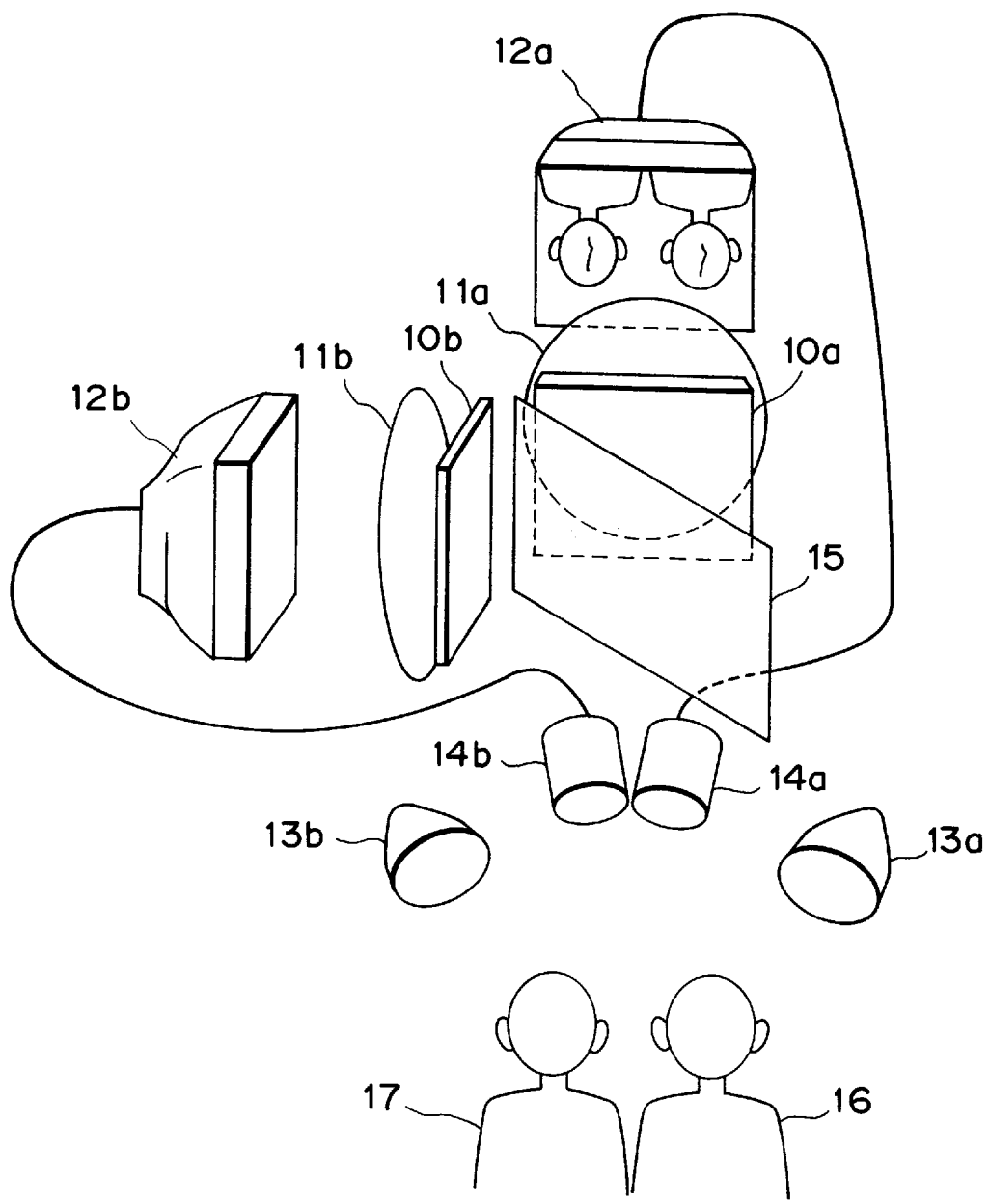
FIG. 3 is a schematic diagram illustrating a first embodiment of a stereoscopic-image display system according to the present invention.

FIG. 3 illustrates the construction of a first embodiment of a stereoscopic-image display system according to the present invention. As shown in FIG. 3, the stereoscopic-image display system includes: transmission-type liquid crystal displays 10a and 10b serving as spatial modulation devices; Fresnel lenses 11a and 11b, as optical elements, having a focal length of 150 mm each disposed at the back of each spatial modulation device 10a and 10b; and black-and-white CRTs 12a and 12b serving as back-lighting devices for emitting light corresponding to images associated with observers. The CRTs 12a and 12b are each disposed outside the focal length for example at positions 160 mm away from lenses 11a and 11b such that the lens 11a is disposed between the CRT 12a and the spatial modulation device 10a and the lens 11b is disposed between the CRT 12b and the spatial modulation device 10b. The CRTs 12a and 12b serve as back-lighting device. The stereoscopic-image display system also includes LED light sources 13a and 13b for emitting light having wavelengths of 850 nm and 950 nm, respectively, which serve as illuminating apparatus for illuminating observers 16, 17.

The stereoscopic-image display system further includes: black-and-white CCD cameras 14a and 14b serving as picture-taking apparatus; and a half mirror 15 for combining images displayed on spatial modulation devices 10a, 10b into one image. In FIG. 3, reference numerals 16, 17 denote observers who observe the stereoscopic image.

FIG. 4 illustrates two observers 16, 17 whose faces are illuminated with a pair of LEDs 13a and 13b disposed in front of the observers wherein face areas 20a are illuminated with the LED 13a and face areas 20b are illuminated with the LED 13b. That is, the right-side area 20a of the face of each observer is illuminated with a light source 13a, and the left-side area 20b of the face of each observer is illuminated with a light source 13b.

Figure 5:
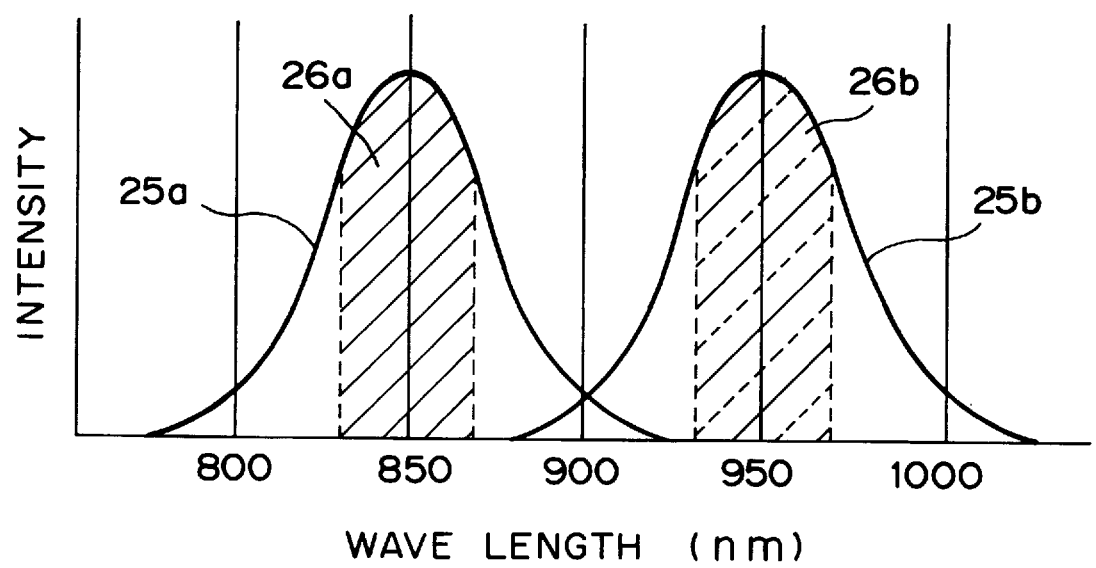
FIG. 5 is a graph illustrating wavelength distributions of light emitted by light sources used in the first embodiment of the stereoscopic-image display system according to the present invention.

FIG. 5 illustrates wavelength characteristics of light emitted by LEDs 13a and 13b, wherein the characteristic curve 25a shows the wavelength distribution of the light emitted by the LED 13a and the characteristic curve 25b shows the wavelength distribution of the light emitted by the LED 13b. As can be seen, the LED 13a emits light having a peak intensity at a wavelength of 850 nm and the LED 13b emits light having a peak intensity at a wavelength of 950 nm. In FIG. 5, zones 26a and 26b denote such wavelength zones that wavelength filters (described later) attached to respective black-and-white CCD cameras 14a and 14b pass selectively light having wavelengths within these wavelength zones. The wavelengths of the light emitted by LEDs 13a and 13b have distributions 25a and 25b having peaks at 850 nm and 950 nm, respectively, as shown in FIG. 5, in which intensities of light in the overlapped zone are less than half the peak intensities. This means that these two light sources emitting different wavelengths can be distinguished from each other.

Figure 6:
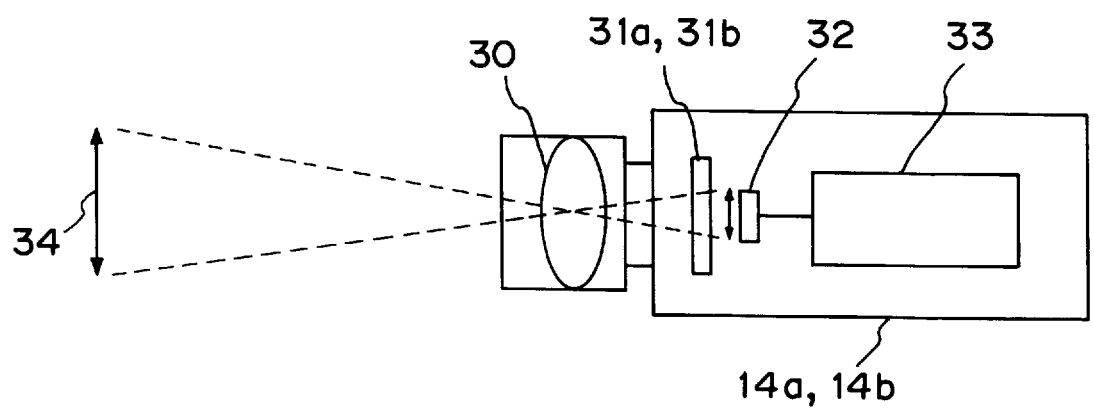
FIG. 6 is a cross-sectional view of a picture-taking apparatus used in the first embodiment of the stereoscopic-image display system according to the present invention.

FIG. 6 is a cross-sectional view of the black-and-white CCD camera 14a (and also of the CCD camera 14b) comprising an imaging lens 30, an interference filter 31a (31b) serving as a wavelength filter, a image sensing device 32 including a CCD chip, a driving circuit 33 for driving the image sensing device. In FIG. 6, there is also shown an object 34 (observers in this case). The CCD camera 14a takes a picture of an observer via the wavelength filter 31a (having a transmission zone of 850 nm±20 nm) to form an image including only the area 20a (FIG. 4) onto which the light having the wavelength zone 26a (FIG. 5) is projected. On the other hand, the CCD camera 14b takes a picture of the observer via the wavelength filter 31b (having a transmission zone of 950 nm±20 nm) to form an image including only the area 20b (FIG. 4) onto which the light having the wavelength zone 26b (FIG. 5) is projected. In this way, the cameras 14a, 14b form images of the right-side and left side areas, respectively, of the face of the observer.

In the case of the system shown in FIG. 3, the images formed by the cameras 14a, 14b, that is, the images of the right-side areas of the faces of the observers and the images of the left-side areas of the faces are transferred to CRTs 12a and 12b, respectively, and displayed on them.

In FIG. 7, observers see virtual images of their own faces (taken into a picture by the CCD cameras 14a, 14b in FIG. 3). For simplicity, FIG. 7 illustrates only one set of the black-and-white CRT 12a and lens 11a of the black-and-white CRTs (12a and 12b) and lenses (11a and 11b). In the embodiment shown in FIG. 3, the images of observers' faces displayed on the CRTs 12a, 12b are converted into virtual images via the lenses 11a and 11b and used as back-lighting devices illuminating the liquid crystal display device. Since the half mirror and the liquid crystal display are not necessary for the explanation of how virtual images are seen by the observers, these elements are not shown in FIG. 7.

In FIG. 7, areas denoted by reference numerals 40, 41, 42, 43 are image areas serving as back-lighting devices. These areas are converted to virtual images via the lens 11a (11b) and act as back-lighting devices illuminating the liquid crystal display device 10a (10b).

Referring to FIGS. 3 through 7, the operation of the stereoscopic-image display system configured in the above-described manner will be described below.

In FIG. 3, a stereoscopic image to be observed by observers 16 and 17 is obtained as follows. A stereoscopic image is produced from two target images, that is, one which is displayed on the liquid crystal display 10a as an image to be observed by the right eye of each observer and the other one which is displayed in a right-to-left inverted form on the liquid crystal display 10b as an image to be observed by the left eye of each observer, wherein these two images displayed on respective displays are combined into one image via the half mirror 15. The reason why the image to be observed by the left eye is displayed on the display 10b in the right-to-left inverted form is as follows. While the image to be observed by the right eye simply passes through the mirror 15, the image to be observed by the left eye is reflected by the mirror 15. Therefore, the image displayed on the display 10b should be inverted beforehand so that observers can have a non-inverted correct image.

LEDs 13a and 13b are positioned on the right and left sides, respectively, in front of observers 16 and 17 so that right-side areas of faces of observers 16 and 17 are illuminated with the LED 13a and left-side areas of faces of observers 16 and 17 are illuminated with the LED 13b as shown in FIG. 4. As shown in FIG. 6, CCD cameras 14a and 14b have interference filters 31a and 31b with transmission wavelength zones of 850±20 nm and 950±20 nm, respectively, which are disposed between image sensing devices 32 and image lenses 30 so that images of the object 34 are formed on image sensing devices 32 in such a manner that images of only areas illuminated with light having wavelengths in zones 26a and 26b, respectively, in FIG. 5 are formed on the corresponding image sensing devices. With the above-described arrangement, the CCD camera 14a takes a picture of only the area 20a shown in FIG. 4, and thus the image of the area 20a is displayed on the black and white CRT 12a. On the other hand, the CCD camera 14b takes a picture of only the area 20b shown in FIG. 4, and thus the image of the area 20b is displayed on the black and white CRT 12b. Black-and-white CRTs 12a and 12b display images of observers 16 and 17 in an upside-down form taken by CCD camera 14a and 14b wherein the brightness and contrast associated with black-and-white CRTs 12a and 12b as well as opening extents of diaphragms of CCD cameras 14a and 14b are adjusted so that high-brightness images of face areas 20a and 20b are displayed.

Referring to FIG. 7, the function of the Fresnel lens 11a (11b) will be described. The Fresnel lens 11a is disposed at a location which allows observers 16 and 17 to see virtual images of themselves displayed in an upside-down fashion on the black-and-white CRT 12a. That is, the black-and-white CRT 12a is placed at a predetermined distant location outside the focal length of the Fresnel lens 11a so that the right (left) eye of the observer 16 can see separately only the area 40 (41) of the screen of the black-and-white CRT 12a and the right (left) eye of the observer 17 can see separately only the area 42 (43) of the screen of the black-and-white CRT 12a, wherein these areas 40 and 42 (41 and 43) may also be enlarged within the limitation determined by the effective diameter of the Fresnel lens 11a.

In this arrangement, when the area 40 (42) is bright, the area 40 (42) can act as a selective light source having a diameter equal to the effective diameter of the Fresnel lens 11a, which acts only for the right eye of the observer 16 (17). This means that the area 40 acts as a back-lighting device for the right eye of the observer 16, and the area 42 acts as a back-lighting device for the right eye of the observer 17. When the area 40 (42) is bright, the area 41 (43) is dark. Therefore, the left eye does not receive the light emitted by the black-and-white CRT 12a. The Fresnel lens 11b also functions in a similar manner to that in the Fresnel lens 11a so that light emitted by the black-and-white CRT 12b can reach only left eyes. Thus, the right-side area 20a of the face of the observer 16 (and 17) shown in FIG. 4 is displayed on the black-and-white CRT 12a as the area 40 (42) shown in FIG. 7 so that only the right eye of the observer 16 (and 17) can see the corresponding bright virtual image, and the left-side area 20b of the face shown in FIG. 4 is displayed on the black-and-white CRT 12b as the area 41 (43) shown in FIG. 7 so that only the left eye of the observer 16 (and 17) can see the corresponding bright virtual image. In this arrangement, because the image displayed on the black-and-white CRT 12b is seen via the half mirror 15 as shown in FIG. 3, the image should be inverted between the right and left in a mirror-inverted fashion beforehand.

According to the above-described function of the system of the present invention, the right-eye image, or the image to be observed by the right eye, displayed on the liquid crystal display 10a as shown in FIG. 3 is illuminated from its back side so that the right-eye image can be seen only by right eyes of observers 16 and 17, and the left-eye image, or the image to be observed by the left eye, displayed on the liquid crystal display 10b is illuminated from its back side so that the left-eye image can be seen only by left eyes of observers 16 and 17. As a result, observers 16 and 17 can see a pair of target images forming a stereoscopic image at the same time. In this way, the system of the present invention provides stereoscopic vision. Even if the observer 16 or 17 moves, the movement is reflected to the position of the face image displayed on the CRT 12, and therefore the stereoscopic vision is maintained.

In this embodiment, the transmission-type liquid crystal displays are used as spatial modulation devices. However, any types of spatial modulation devices which can pass light and display target images such as films on which images are recorded may also be used. Furthermore, LEDs are used as light sources in this embodiment. Alternatively, any types of light sources which emit two different light rays at infrared wavelengths, such as tungsten halogen lamps which have a wavelength filter for limiting wavelengths within preferable regions may also be used. Furthermore, a prism system may be used instead of the half mirror for synthesizing optical images.

Second Embodiment

Figure 8:
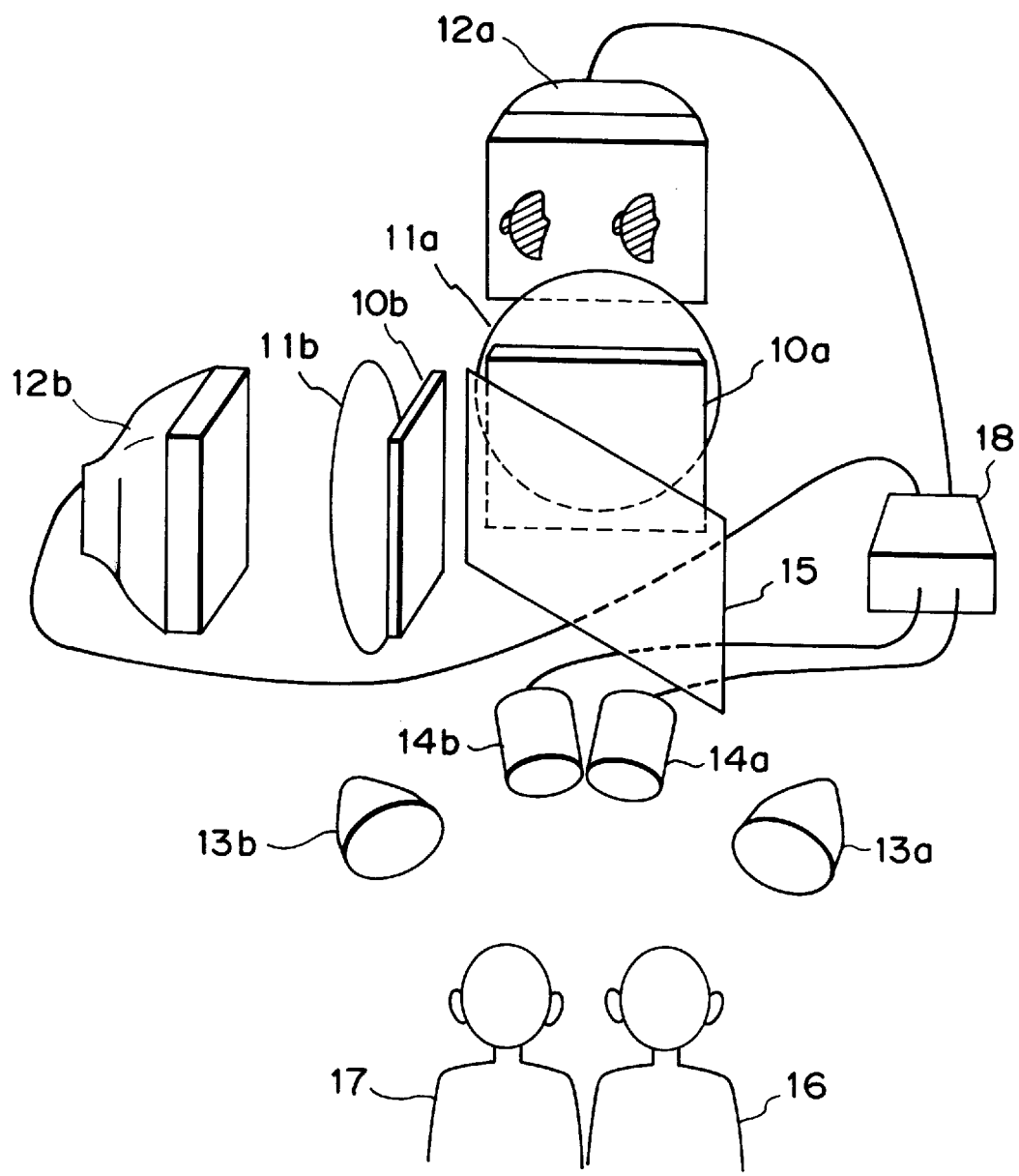
FIG. 8 is a schematic diagram illustrating a second embodiment of a stereoscopic-image display system according to the present invention.

FIG. 8 illustrates the construction of a second embodiment of a stereoscopic-image display system according to the present invention. As shown in FIG. 8, the stereoscopic-image display system includes: transmission-type liquid crystal displays 10a and 10b serving as spatial modulation devices; Fresnel lenses 11a and 11b having a focal length of 150 mm each disposed at the back of each spatial modulation device 10a and 10b; and black-and-white CRTs 12a and 12b serving as back-lighting devices for emitting light corresponding to images associated with observers. CRTs 12a and 12b are each disposed opposite to spatial modulation devices 10a and 10b via lenses 11a and 11b at positions 160 mm far from lenses 11a and 11b. The stereoscopic-image display system also includes: LEDs 13a and 13b serving as light sources for emitting light having wavelengths 850 nm and 950 nm, respectively; black-and-white CCD cameras 14a and 14b serving as apparatus for taking pictures; and a half mirror 15 for combining images displayed on spatial modulation devices 10a and 10b into one image. In FIG. 8, there are also shown observers 16 and 17 who observe a stereoscopic image.

The stereoscopic-image display system further includes a differential processing unit 18 for calculating the difference between image signals obtained via a pair of cameras 14a and 14b.

The stereoscopic-image display system constructed in the above-described manner operates in a basically similar manner to that in the first embodiment according to the present invention which has been described above in connection with FIG. 3. Therefore, similar or corresponding elements are denoted by similar reference numerals, and these elements will not be explained here again. However, only different portions will be described below. Video signals associated with face images of observers 16 and 17 obtained separately via cameras 14a and 14b are applied to the differential processing unit 18. The differential processing unit 18 calculates the difference between these video signals and outputs the resultant signal to black-and-white CRTs 12a and 12b.

If background image signal is denoted by X, the image signal associated with only the left-side area of the face is denoted by L, and the image signal associated with only the right-side area of the face is denoted by R, then the image signal A associated with the right-side area of the face obtained by the camera 14a can be written as $$A = R + X,$$

and image signal B associated with the left-side area of the face obtained by the camera 14b can be written as $$B = L + X.$$

Since there is no common portion between the image signal R and the image signal L, the background image signal X becomes $$X = A \times B \ (x \text{ denotes logical AND operation}).$$

Therefore, the image signal R associated only with the right-side area of the face can be extracted by subtracting the background signal from the image signal A associated with the right-side area of the face, that is, $$R = A - A \times B.$$

Similarly, the image signal R associated only with the left-side area of the face can be extracted by subtracting the background signal from the image signal B associated with the left-side area of the face, that is, $$L = B - A \times B.$$

The differential processing done by the processing unit 18 results in cancellation of the common portion between the image of the right-side area of the face obtained via the camera 14a and the image of the left-side area of the face obtained via the camera 14b, and thus the image portion unsuitable as the back-lighting device, such as the background image behind observers, is removed. In principle, on the other hand, there is no common portion between the image of the left-side area of the face and the image of right-side area of the face. Therefore, these images are never deleted by the processing unit 18.

Third Embodiment

Figure 9:
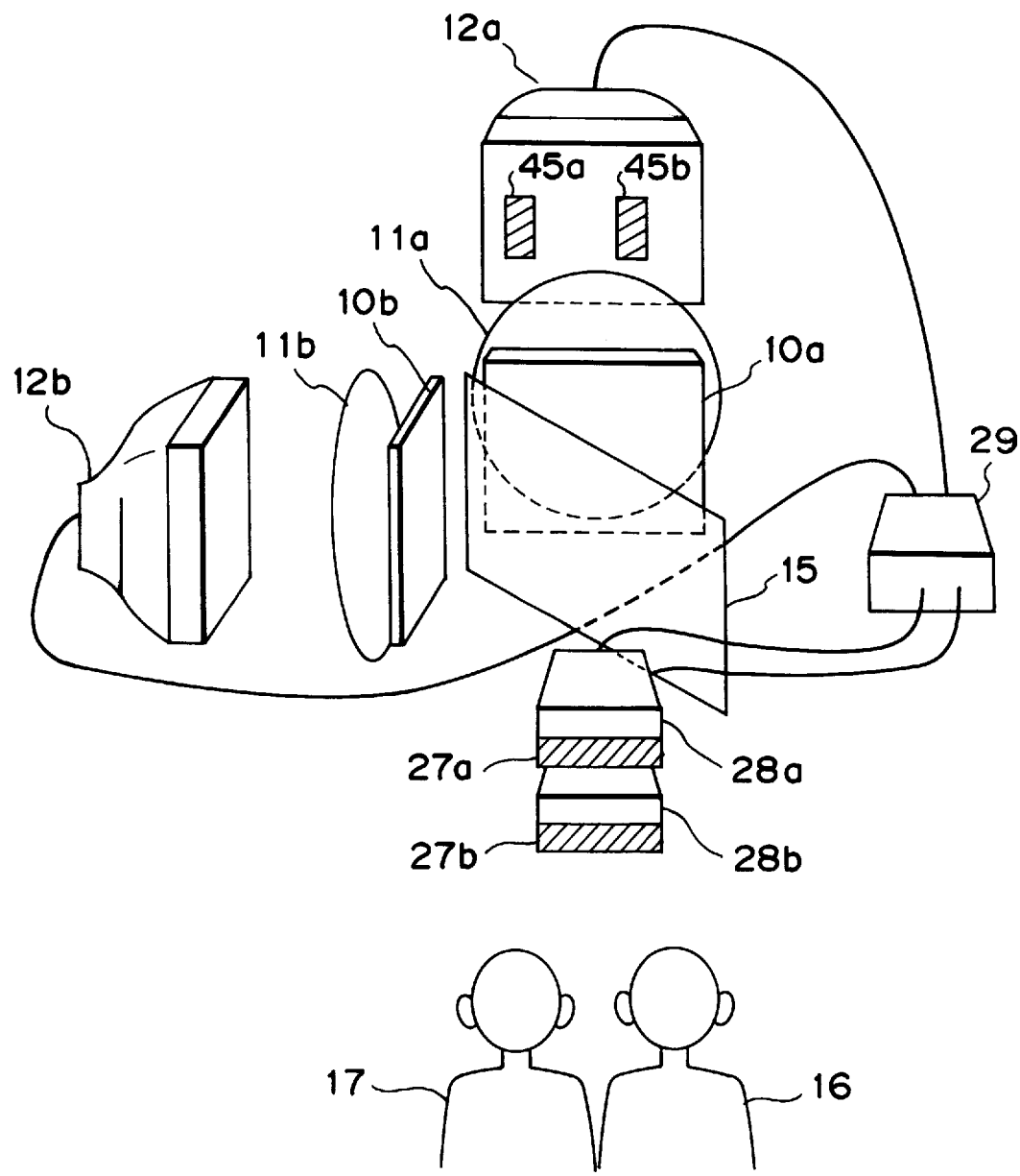
FIG. 9 is a schematic diagram illustrating a third embodiment of a stereoscopic-image display system according to the present invention.

FIG. 9 illustrates the construction of a third embodiment of a stereoscopic-image display system according to the present invention. In the above-described first and second embodiments, positions and shapes of back-lighting devices are determined by face images of observers obtained by cameras. In this third embodiment, in contrast, ultrasonic waves are radiated toward observers, and face images (so called "B-mode images") of observers are produced from echo signals of ultrasonic waves, and displayed as back-light images.

As shown in FIG. 9, the stereoscopic-image display system of the third embodiment includes: transmission-type liquid crystal displays 10a and 10b serving as spatial modulation devices; Fresnel lenses 11a and 11b having a focal length of 150 mm disposed at back sides of spatial modulation devices 10a and 10b, respectively; black-and-white CRTs 12a and 12b serving as back-lighting devices for emitting light corresponding to observer's images, wherein these black-and-white CRTs 12a and 12b are disposed opposite to spatial modulation devices 10a and 10b via lenses 11a and 11b at positions 160 mm far from lenses 11a and 11b; ultrasonic wave generators 27a and 27b for generating ultrasonic waves having frequencies of 100 kHz and 120 kHz, respectively, toward observers 16 and 17; ultrasonic wave detectors 28a and 28b for detecting ultrasonic waves generated by the ultrasonic wave generators wherein the ultrasonic wave detector 28a selectively detects the echo signal of the ultrasonic wave having a frequency corresponding to that of the ultrasonic wave generator 27a, and the ultrasonic wave detector 28b selectively detects the echo signal of the ultrasonic wave having a frequency corresponding to that of the ultrasonic wave generator 27b; half mirror 15 for combining images displayed on spatial modulation devices 10a and 10b into one image; and ultrasonic-wave image output device 29. In FIG. 9, reference numerals 45a and 45b denote images of right-side areas of faces of observers 16 and 17, respectively, displayed on the black-and-white CRT 12a, that is, these areas are light emitting areas of the black-and-white CRT 12a.

The stereoscopic-image display system constructed in the above-described manner operates in a basically similar manner to that in the first embodiment according to the present invention which has been described earlier in connection with FIG. 3. Therefore, similar or corresponding elements are denoted by similar reference numerals, and these elements will not be explained here again. However, only different portions will be described below.

Ultrasonic waves having two different wavelengths generated by ultrasonic wave generators 27a and 27b are reflected by observers 16 and 17, and reflected ultrasonic waves are detected by ultrasonic wave detectors 28a and 28b. FIG. 10 illustrates the operation principle of the third embodiment. In FIG. 10, the ultrasonic wave generator 27a and the ultrasonic wave detector 28a are disposed so that the ultrasonic wave detector 28a can detect the ultrasonic wave, as horizontally cross-sectional information, which has been generated in a horizontal direction by the ultrasonic wave generator 27a and is reflected by the observer's face. Similarly, the ultrasonic wave generator 27b (which is positioned below the generator 27a) and the ultrasonic wave detector 28b are disposed so that the ultrasonic wave detector 28b can detect the ultrasonic wave, as horizontally cross-sectional information, which is generated in a horizontal direction by the ultrasonic wave generator 27b and reflected by the observer's face.

More specifically, ultrasonic wave generators 27a and 27b generate ultrasonic waves and scan these generated ultrasonic waves in the horizontal directions. The ultrasonic waves generated by the generators 27a and 27b are reflected by observers who are present between the horizontally cross sections which have a predetermined distance, and then detected by the detectors 28a and 28b. The positions of the observer's face will be obtained by analyzing the detected echo signals.

Outputs of ultrasonic wave detectors 28a and 28b are connected to the image output device 29. From echo signals of ultrasonic waves generated by ultrasonic wave detectors 28a and 28b, the image output device 29 determines the position of the face of the observer, and then, predetermined images for the right and left eyes are displayed in areas of black-and-white CRTs 12a and 12b, the positions of that areas are assigned in accordance with the determined positions. It is easy to make only such areas corresponding to the face of the observer bright while maintaining the other areas entirely dark. Therefore, it is possible to prevent crosstalk between right and left images in which the left eye (right eye) gets weak perception of the right-eye (left-eye) image due to disturbance in light.

Fourth Embodiment

Figure 11:
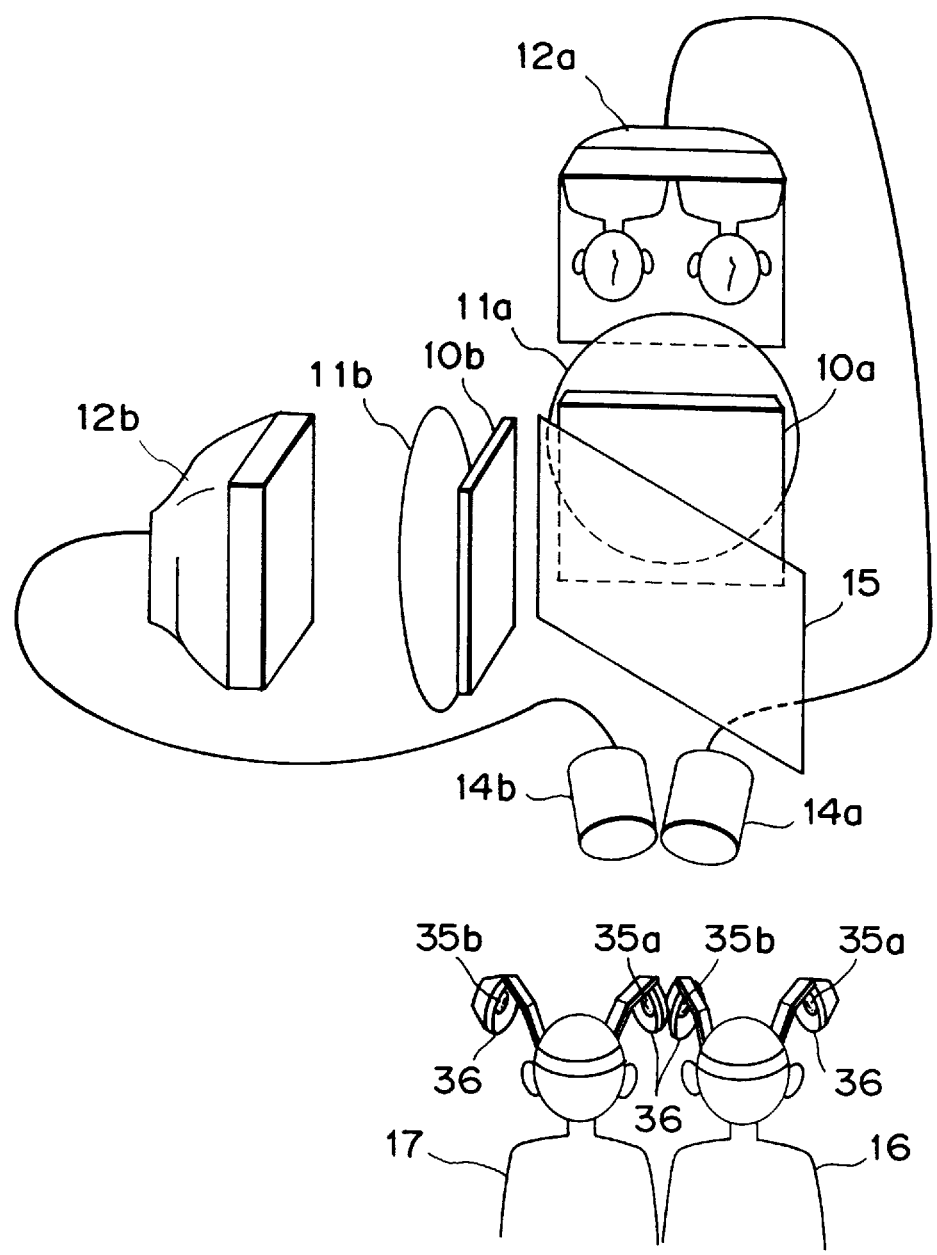
FIG. 11 is a schematic diagram illustrating a fourth embodiment of a stereoscopic-image display system according to the present invention.

A fourth embodiment described below is an improved modification derived from the first embodiment. FIG. 11 illustrates the construction of the fourth embodiment of a stereoscopic-image display system according to the present invention. As shown in FIG. 11, the stereoscopic-image display system of the fourth embodiment includes: transmission-type liquid crystal displays 10a and 10b serving as spatial modulation devices; Fresnel lenses 11a and 11b having a focal length of 150 mm disposed at back sides of spatial modulation devices 10a and 10b, respectively; black-and-white CRTs 12a and 12b serving as back-lighting devices for emitting light corresponding to observer's images, wherein these black-and-white CRTs 12a and 12b are disposed opposite to spatial modulation devices 10a and 10b via lenses 11a and 11b at positions 160 mm far from lenses 11a and 11b; LED light sources 35a and 35b each having a light shielding cover 36, serving as illumination light sources which emit light having wavelengths of 850 nm and 950 nm, respectively, wherein these LED light sources 35a and 35b are attached to the head of each observer with a head band; black-and-white CCD cameras 14a and 14b serving as picture-taking apparatus; and a half mirror 15 for combining images displayed on spatial modulation devices 10a, 10b into one image. In FIG. 11, there are also shown observers 16 and 17 who observe a stereoscopic image.

The stereoscopic-image display system constructed in the above-described manner operates in a basically similar manner to that in the first embodiment according to the present invention which has been described earlier in connection with FIG. 3. Therefore, similar or corresponding elements are denoted by similar reference numerals, and these elements will not be explained here again. However, only different portions will be described below. As described above, LED light sources 35a and 35b are attached to the head of each observer 16 and 17. This assures that the right-side area and the left-side area of the face of each observer are illuminated with LED light sources 35a and 35b, respectively. In the first embodiment described above, observer's faces are illuminated with light sources 13 which are placed at fixed locations. As a result, if an observer moves to a location which cannot be covered by the light sources 13, it becomes impossible to produce correct backlight images. In contrast, light sources 35 according to the fourth embodiment have looser limitations than light sources 13 of the first embodiment, and light sources 35 can cover a wider area in which observers are allowed to move. Light shielding covers 36 are used to prevent a light ray emitted by a light source attached to one observer from reaching another observer.

Application to Endoscope

Figure 12:
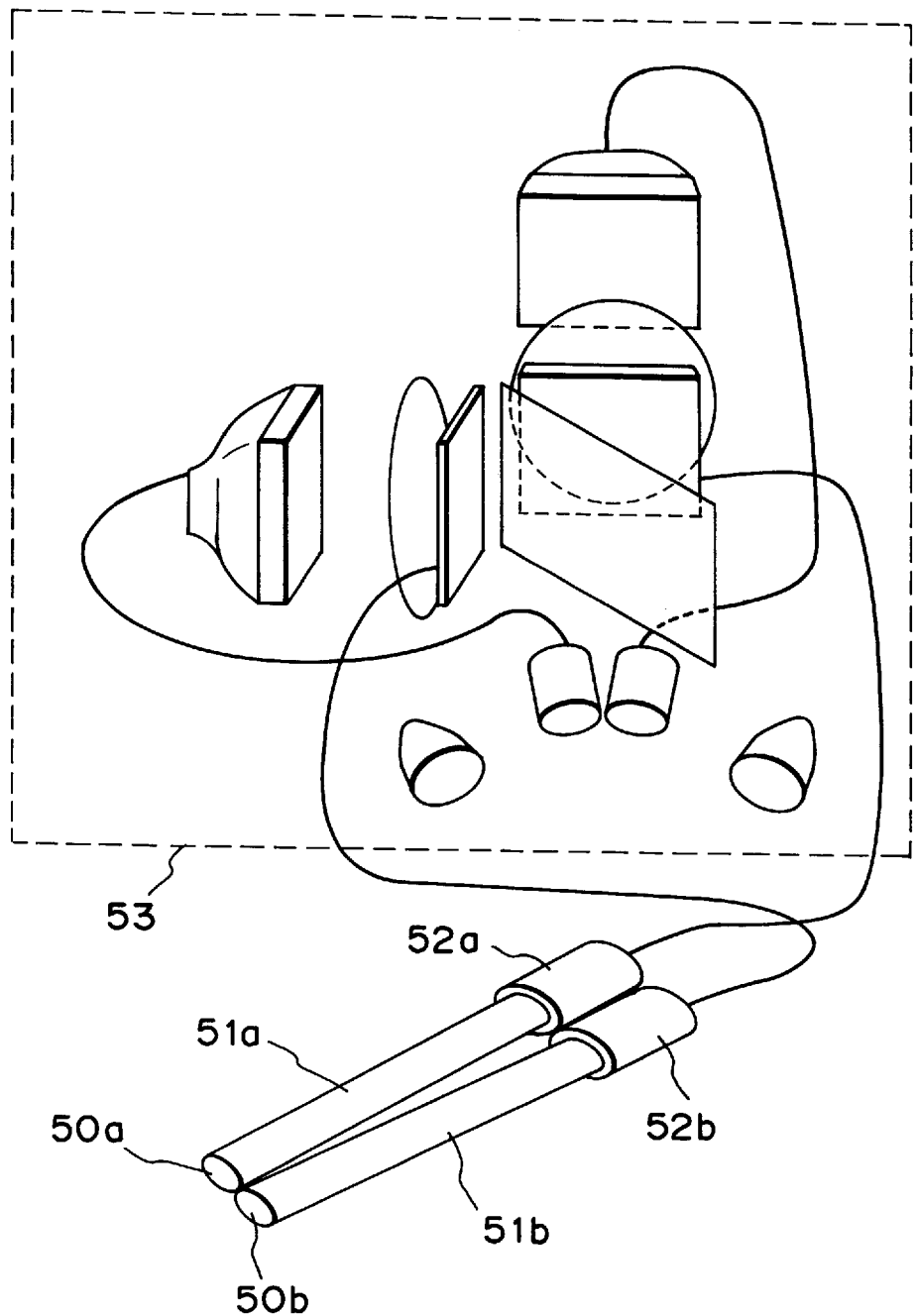
FIG. 12 is a schematic diagram illustrating an application of the present invention to an endoscope observing system.

FIG. 12 illustrates the construction of application of the fourth embodiment to an endoscope. As shown in FIG. 12, the system includes: objective lenses 50a and 50b for taking pictures of an object; lens tubes 51a and 51b having optical systems for transmitting the above obtained images wherein these lens tubes 51a and 51b are disposed at an angle corresponding to a convergence angle of observer's eyes; CCD cameras 52a and 52b; and a stereoscopic-image display system 53 according to the first embodiment of the present invention, which has been described earlier in connection with FIG. 3.

The endoscope system constructed in the above-described manner operates as follows. Images of an object taken via objective lenses 50a and 50b are transmitted through lens tunes 51a and 51b having the convergence angle adjusted for stereoscopic vision so as to form a right-eye image (to be observed by a right eye) and a left-eye image (to be observed by a left eye) on CCD cameras 52a and 52b, respectively, thereby providing stereoscopic vision in the endoscope. The above-described two images are applied to liquid crystal displays 10a and 10b, respectively, of the stereoscopic-image display system 53 and displayed on them as a pair of images forming a stereoscopic image which provides stereoscopic vision associated with the image taken by the above endoscope to a large number of observers according to functions of the stereoscopic-image display system 53 as described above in connection with the first embodiment of the present invention.

Fifth Embodiment

A fifth embodiment described below uses only one camera.

FIG. 13 illustrates the construction of the fifth embodiment of the stereoscopic-image display system which comprises: transmission-type liquid crystal displays 10a and 10b serving as spatial modulation devices; Fresnel lenses 11a and 11b having a focal length of 150 mm serving as optical lenses and disposed at back sides of spatial modulation devices 10a and 10b, respectively; black-and-white CRTs 12a and 12b serving as back-lighting devices for emitting light corresponding to observer's images, wherein these black-and-white CRTs 12a and 12b are disposed opposite to spatial modulation devices 10a and 10b via lenses 11a and 11b at positions 160 mm far from lenses 11a and 11b; a CCD camera 14 serving as a picture-taking apparatus; and a half mirror 15 for combining images displayed on the spatial modulation devices 10a and 10b into one image. In FIG. 13, there are also shown observers 16 and 17 who observe a stereoscopic image.

The stereoscopic-image display system constructed in the above-described manner operates in a basically similar manner to that in the first embodiment described above in connection with FIG. 3. Therefore, similar or corresponding elements are denoted by similar reference numerals, and these elements will not be explained here again. However, only different portions will be described below. A stereoscopic image to be observed by observers 16 and 17 shown in FIG. 13 is produced from two images, one of which is displayed on the liquid crystal display 10a as an image to be viewed by the right eye of each observer, and the other one of which is displayed in a right-to-left inverted form on the liquid crystal display 10b as an image to be viewed by the left eye of each observer, wherein these two images displayed on respective displays are combined into one image via the half mirror 15. The CCD camera 14 takes a picture of observers seen from the front side. An image signal obtained is applied to the image processing unit 90. The image processing unit 42 extracts contours 20, 21 of observers' faces, and then detects the centroids 22 and 23 of these regions surrounded by these contours 20 and 21, respectively.

Figure 14A:
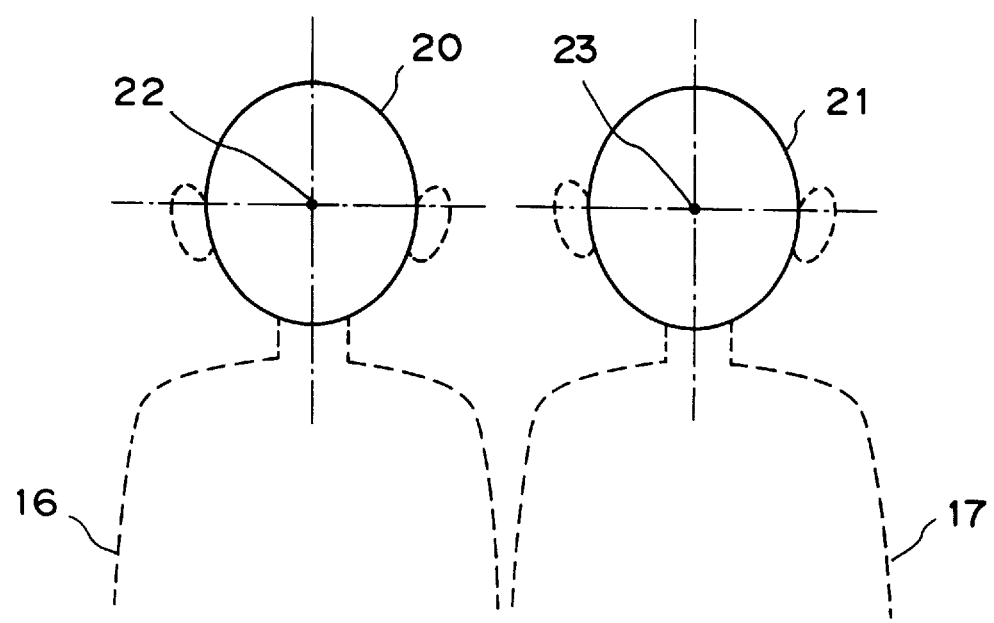
FIG. 14A is a schematic diagram illustrating the operation of the fifth embodiment of the stereoscopic-image display system according to the present invention.
Figure 14B:
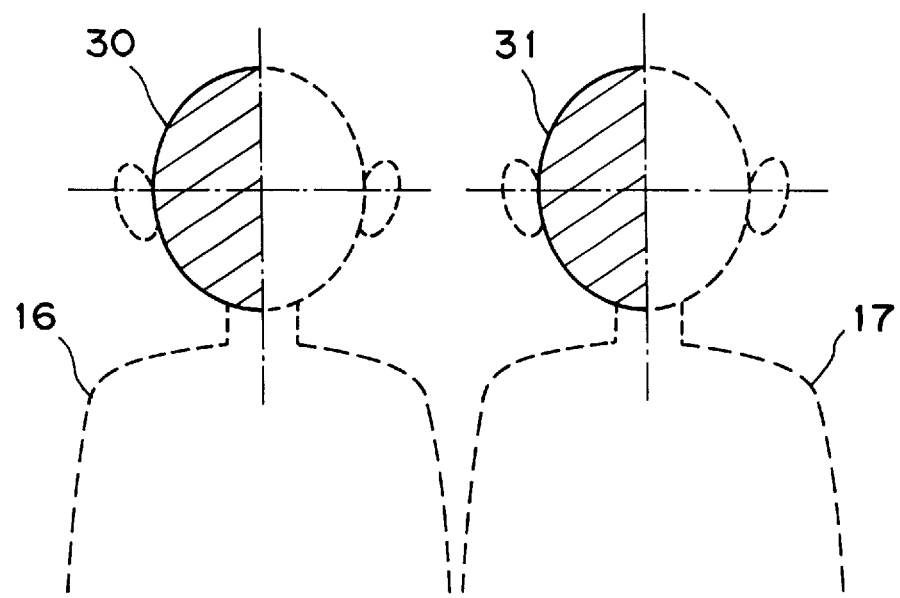
FIGS. 14B and 14C are schematic diagrams illustrating the operation of the fifth embodiment of the stereoscopic-image display system according to the present invention.
Figure 14C:
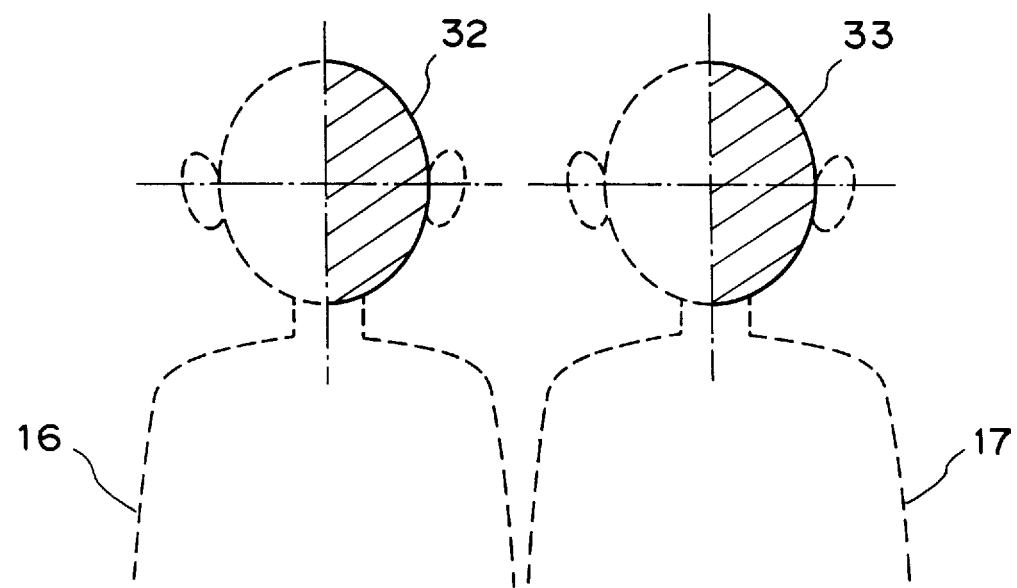

FIGS. 14A, 14B, and 14C illustrate how images of observers 16 and 17 taken by the CCD camera 14 are processed by the image processing unit 90.

If light emitted from a light source (not shown) is projected only onto faces of observers, then an image obtained by the camera 14 consists mainly of the faces of the observers. In FIG. 14A, reference numerals 20 and 21 denote contours of observers. The image processing unit 90 performs edge-extraction processing on the image signal output by the camera 14 (using for example a Laplacian filter) so as to extract its edge.

The image processing unit 90 calculates areas of regions surrounded by contours 22 and 23, respectively, and further determines the center of area associated with each region (face region) surrounded by contours 20 and 21. the obtained position of the center of area of each region surrounded by contours 20 and 21, respectively, is denoted by reference numerals 22 and 23 in FIG. 14.

In FIG. 14B, reference numerals 30 and 31 denote images corresponding to right-side areas of face regions surrounded by contours 20 and 21, respectively, wherein these images 30 and 31 are produced based on centers of areas 22 and 23, respectively.

Similarly, reference numerals 32 and 33 in FIG. 14C denote images corresponding to left-side areas of face regions produced based on centers of areas 22 and 23. In the above processing, shapes of observers faces are known. Images 30, 31, 32, and 33 are produced from an image having a shape similar to that of a human face which has been prepared beforehand and is stored in the image processing unit 90. After determining each position of the center of area, the image processing unit 90 produces images in such a manner that the determined positions become centers of respective images.

The graphic images 30, 31, 32, and 33 may serve to operate as back-lighting devices for the LCD display 10, and therefore do not have to be figures representing human faces.

The image processing unit 90 further divides each face contour 20, 21 into right and left areas employing each centroid 22, 23 as the symmetry center, and produces half-face images 30, 31 and 32, 33 as shown in FIGS. 15A and 15B. The images 30, 31 are displayed with high brightness in a upside-down fashion on the black-and-white CRT 12a, while the images 32, 33 are displayed with high brightness in a upside-down fashion as well as in a right-to-left inverted fashion on the black-and-white CRT 12b. The reason why the images 32 and 33 are displayed on the display 10b not only in the upside-down fashion but also in the right-to-left inverted fashion as in mirror images is that these images 32 and 33 are reflected by the half mirror 15 and then viewed by the observers. Therefore, as a matter of course, the image displayed on the liquid crystal display 10b should also be inverted between the right and left as in mirror images.

According to the above-described function of the system of the present embodiment, a target image for right eyes displayed on the liquid crystal display 10a as shown in FIG. 13 is illuminated from its back side so that the image can be seen only by right eyes of observers 16 and 17, while a target image for left eyes displayed on the liquid crystal display 10b is illuminated from its back side so that the image for left eyes can be seen only by left eyes of observers 16 and 17. These right and left target images are combined into one image via the half mirror 15 so that a series of a pair of target images can be viewed. In this way, the system provides stereoscopic vision with no flicker for both observers at the same time.

Even if the observer 16 or 17 moves, the stereoscopic vision is still provided as long as the observer is in a region which allows the CCD camera 14 to take a picture of the observer.

In this example, an image for right eyes is displayed on the liquid crystal display 10a. However, a similar function can also be achieved even if every condition is inverted between the right and left.

In the above fifth embodiment, the transmission-type liquid crystal displays are used as the spatial modulation devices. However, any type of spatial modulation device which can pass light and display a target image such as a film on which an image is recorded may also be used.

Application of the Fifth Embodiment to an Endoscope

Figure 15:
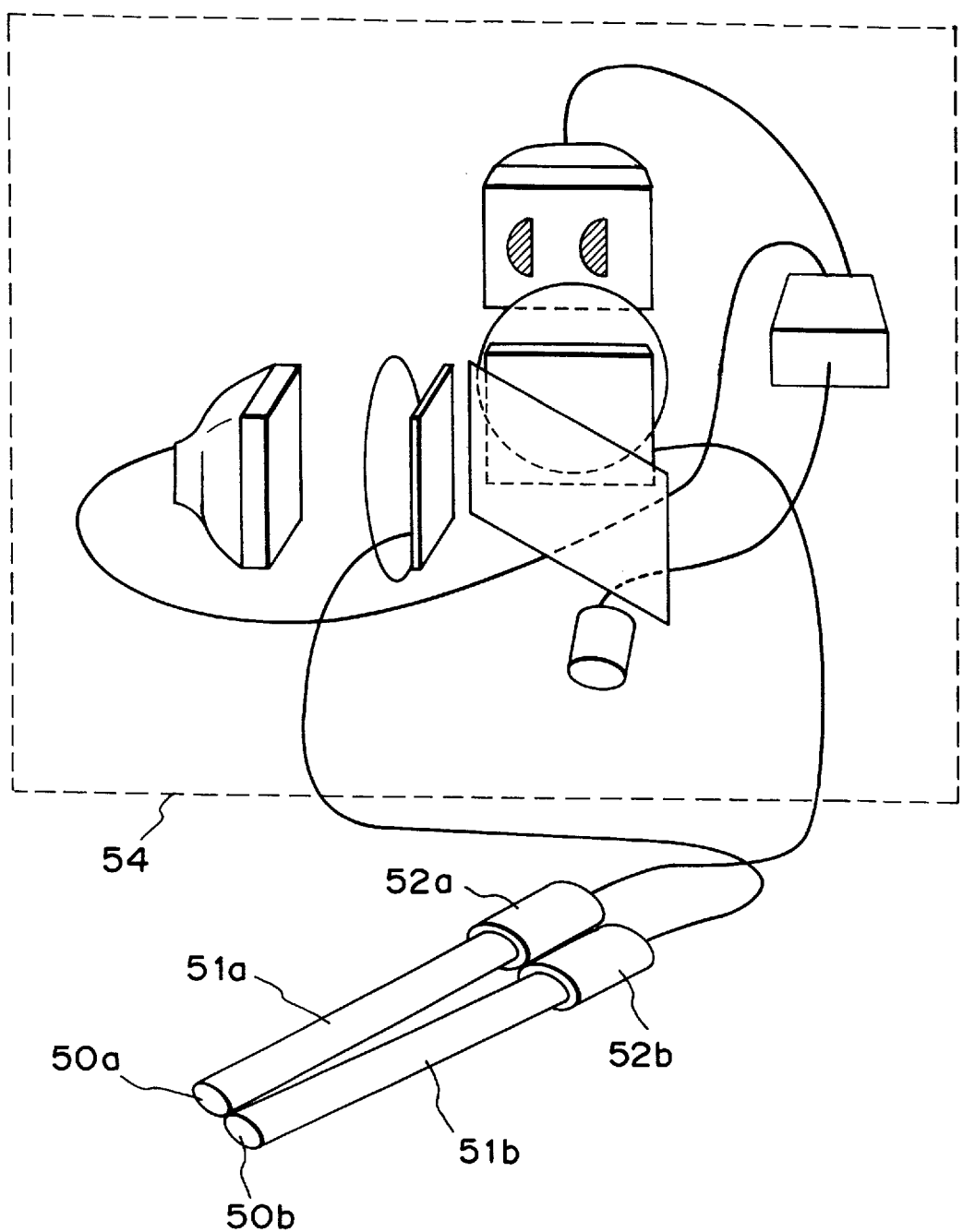
FIG. 15 is a schematic diagram illustrating a modification of the fifth embodiment in which the present invention is applied to an endoscope system.

FIG. 15 illustrates the construction of a fifth embodiment of a stereoscopic-image display system applied to an endoscope. As shown in FIG. 15, the system includes: objective lenses 50a and 50b for taking pictures of an object; lens tubes 51a and 51b having optical systems for transmitting the above obtained images wherein these lens tubes 51a and 51b are disposed at an angle corresponding to a convergence angle of observer's eyes; CCD cameras 52a and 52b; and a stereoscopic-image display system 54 described above in connection with FIG. 13.

The endoscope system constructed in the above-described manner operates as follows. Two images of an object taken via objective lenses 50a and 50b are transmitted through lens tunes 51a and 51b having the convergence angle adjusted for stereoscopic vision so as to form an image for right eyes and an image for left eyes on CCD cameras 52a and 52b, respectively, thereby providing stereoscopic vision in the endoscope. The above-described two images are applied to liquid crystal displays 10a and 10b, respectively, of the stereoscopic-image display system 54 and displayed on them as a pair of target images to provide stereoscopic vision associated with the image taken by the above endoscope to a large number of observers according to functions of the stereoscopic-image display system 53 as described above in connection with the sixth embodiment.

Image sensing devices 52a and 52b in this embodiment of the present invention may also be disposed adjacent to the objective lenses 50a and Sob, respectively, so that electric signals representing images are produced by these image sensing devices and then transmitted through the lens tubes 51a and 51b, whereby it becomes possible to freely select the shapes of lens tubes more suitable for a specific application.

Sixth Embodiment

In the above first through fifth embodiments, it is assumed that a plurality of observers are present along a line side to side. However, in many practical applications, there are also observers one behind another.

According to a sixth embodiment described below, stereoscopic vision is also provided to such observers present one behind another.

Figure 16:
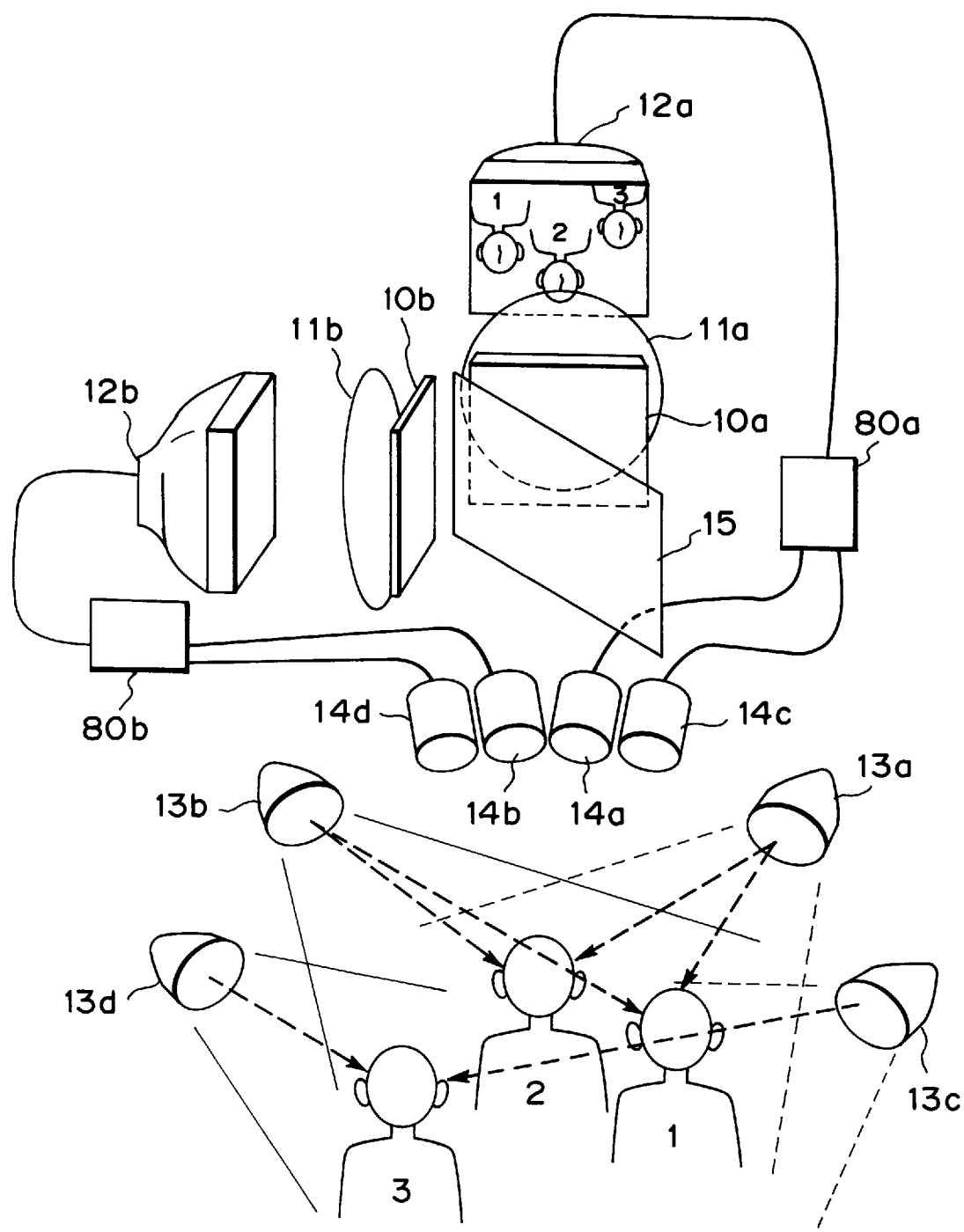
FIG. 16 is a schematic diagram illustrating a sixth embodiment of a stereoscopic-image display system according to the present invention.

FIG. 16 illustrates the construction of the sixth embodiment of the stereoscopic-image display system which comprises: transmission-type liquid crystal displays 10a and 10b serving as spatial modulation devices; Fresnel lenses 11a and 11b having a focal length of 150 mm disposed at back sides of spatial modulation devices 10a and lob, respectively; black-and-white CRTs 12a and 12b serving as back-lighting devices for emitting light corresponding to observer's images, wherein these black-and-white CRTs 12a and 12b are disposed opposite to spatial modulation devices 10a and 10b via lenses 11a and 11b at positions 160 mm far from lenses 11a and 11b; LED light sources 13a, 13b, 13c, and 13d serving as illuminating light sources for emitting light having wavelengths 900 nm, 850 nm, 950 nm, and 800 nm, respectively; black-and-white CCD cameras 14a, 14b, 14c, and 14d serving as apparatus for taking pictures; a half mirror 15 for combining images displayed on the spatial modulation devices 10a and 10b into one image; and signal processing circuits 80a and 80b. In this arrangement, LED 13a and LED 13b mainly illuminate observers #1 and #2 near the system, and LED 13c and LED 13d mainly illuminate an observer #3 at a rear position. The CCD cameras 14a, 14b, 14c, and 14d are attached with wavelength filters having wavelengths 900±10 nm, 850±10 nm, 950±10 nm, and 800±10 nm, respectively, so that they can take pictures of only observers' faces illuminated with LEDs 13a, 13b, 13c, and 13d, respectively. Video signals associated with the face images of observers #1, #2, and #3 are applied to the signal processing circuits 80a and 80b. The signal processing circuit 80a performs processing required for displaying observers' images taken by the black-and-white CCD camera 14a (images of observers #1 and #2 in this case) and an observer's image taken by the black-and-white CCD camera 14c (an image of observer #3 in this case) on the screen of the black-and-white CRT 12a in such a manner that these images are superimposed on each other or displayed separately. The signal processing circuit 80b performs processing required for displaying observers' images taken by the black-and-white CCD camera 14b (images of observers #1 and #2 in this case) and an observer's image taken by the black-and-white CCD camera 14d (an image of observer #3 in this case) on the screen of the black-and-white CRT 12b in such a manner that these images are superimposed on each other or displayed in separate regions.

In the case where observers' images are displayed in separate regions, these regions correspond to illumination regions assigned to respective LEDs depending on their locations in the direction from the front to the back so that the LEDs can illuminate only right-side (or left-side) areas of faces of observers occupying positions in the respective illumination regions.

That is, the LED light source 13a illuminates the right-side face areas of the observers #1 and #2, and images of these right-side face areas are obtained via the CCD camera 14a. The LED light source 13b illuminates the left-side face areas of the observers #1 and #2, and images of these left-side face areas are obtained via the CCD camera 14b. Similarly, the LED light source 13c illuminates the right-side face area of the observer #3, and the image of this right-side face area is obtained via the CCD camera 14c. Furthermore, the LED light source 13d illuminates the left-side face area of the observer #3, and the image of this left-side face area is obtained via the CCD camera 14d. The obtained images of right-side face areas of the individual observers are applied to the signal processing circuit 80a, and the obtained images of left-side face areas of the observers are applied to the signal processing circuit 80b.

Of observers #1–#3, the observers #1 and #2 occupying front positions are illuminated with LEDs 13a and 13b. On the other hand, the observer #3 occupying a rear position is illuminated with LEDs 13c and 13d. As can be seen from this specific example, a plurality of LEDs are disposed in the direction from the front to the rear so that approximately equal illumination is provided to plural observers occupying various positions in the direction from the front to the rear. Therefore, observers can move within a wide area, and a great number of people can be observers.

In this sixth embodiment in which four LEDs (13a–13d) having different frequency bands are used, there are provided four picture-taking apparatus (14a–14d) having characteristics corresponding to those of these LEDs. However, if one camera which can resolve a plurality of frequency bands and can take corresponding pictures is available, only this single camera is enough to do all required functions.

Furthermore, the technique of differential processing associated with right-side and left-side face areas described above in connection with the second embodiment may also be applied to this seventh embodiment.

Application to Endoscope

Figure 17:
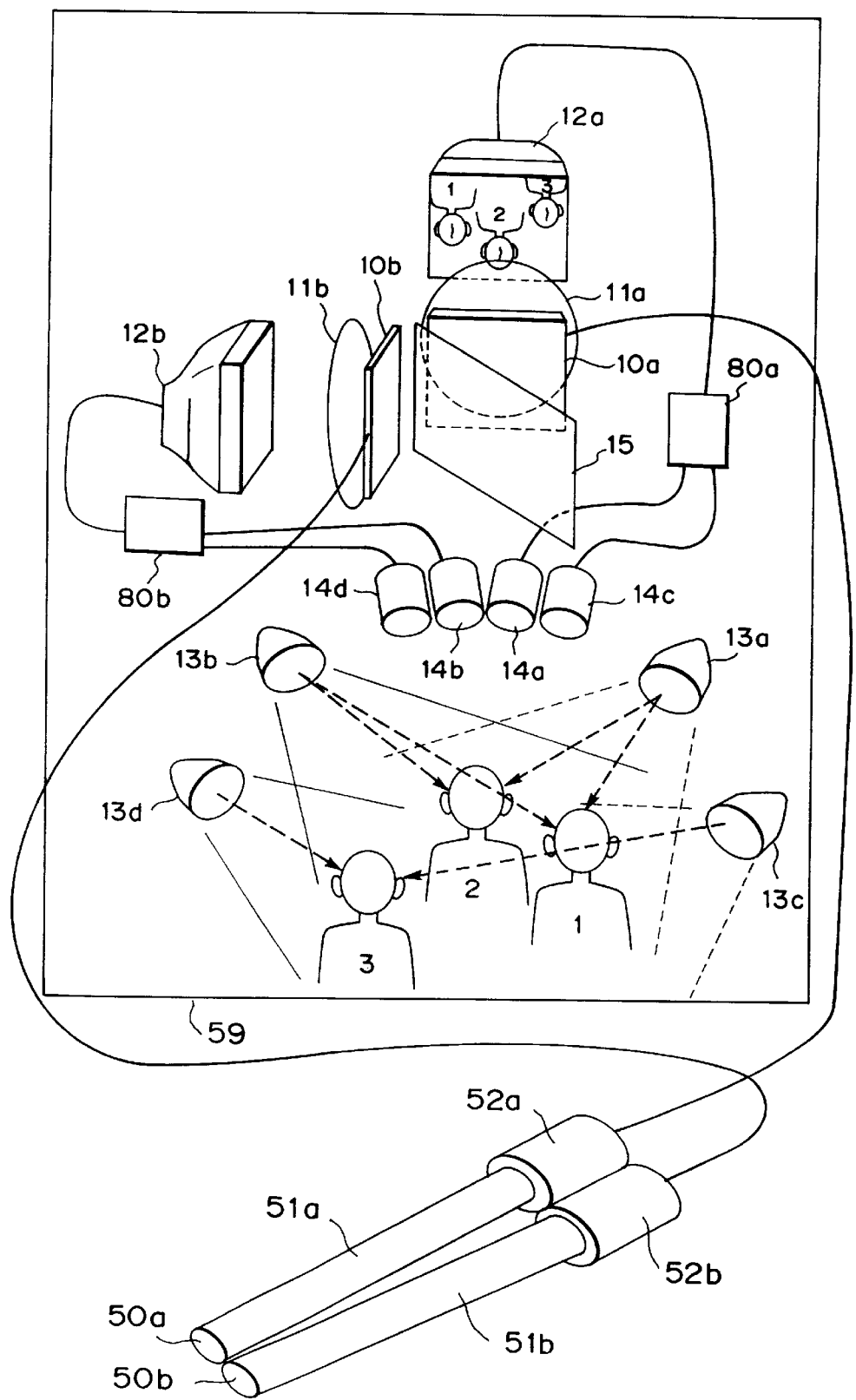
FIG. 17 is a schematic diagram illustrating an application of the sixth embodiment to an endoscope system.
Figure 22:
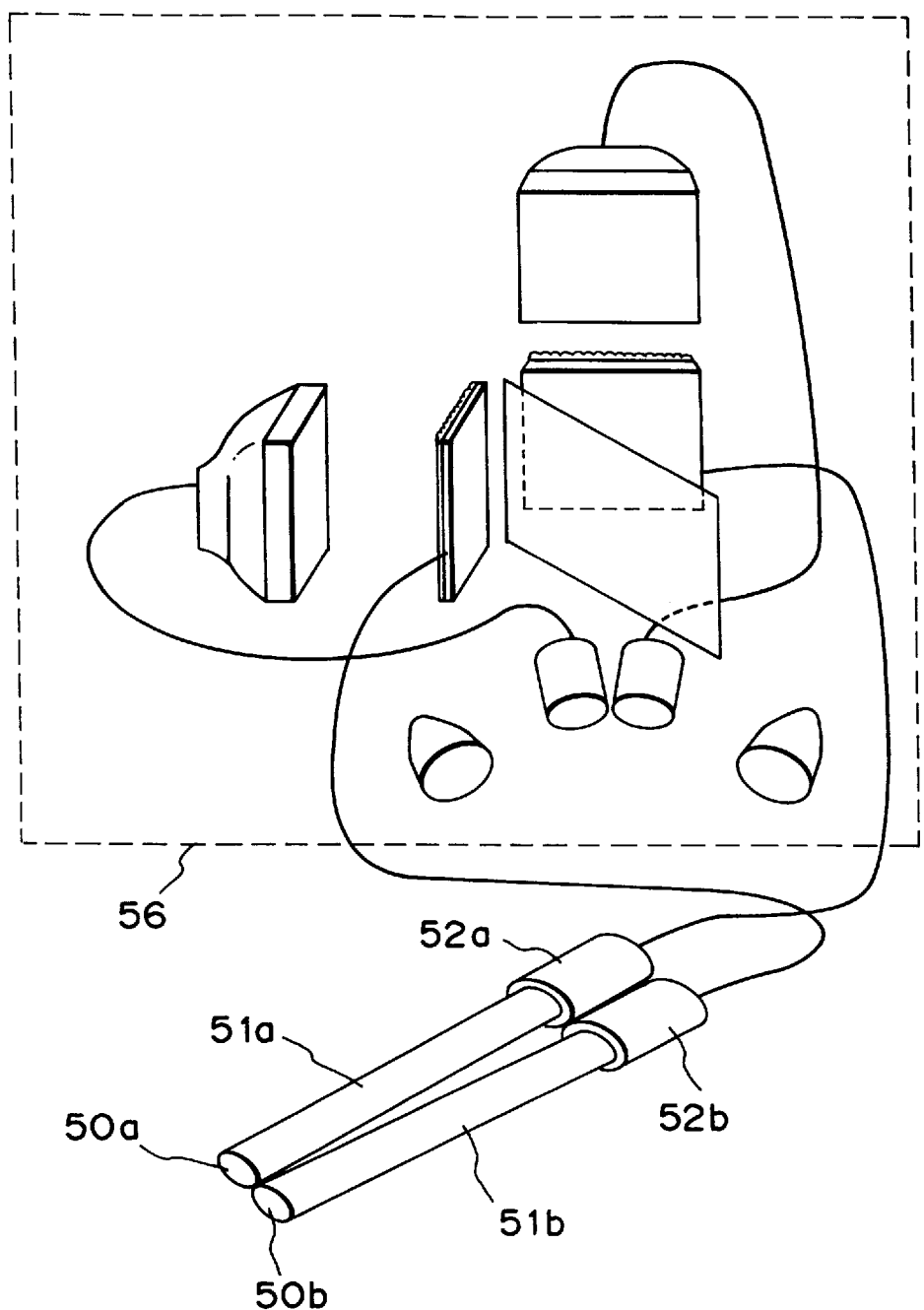
FIG. 22 is a schematic diagram illustrating an application of the eighth embodiment to an endoscope system.

FIG. 17 illustrates a system in which the stereoscopic-image display system according to the above sixth embodiment is applied to an endoscope. As shown in FIG. 22, the system includes: objective lenses 50a and 50b for taking pictures of an object; lens tubes 51a and 51b having optical systems for transmitting the above obtained images wherein these lens tubes 51a and 51b are disposed at an angle corresponding to a convergence angle of observer's eyes; and CCD cameras 52a and 52b.

The endoscope operates in a manner similar to that in endoscopes according to the previous embodiments.

Seventh Embodiment

Figure 18:
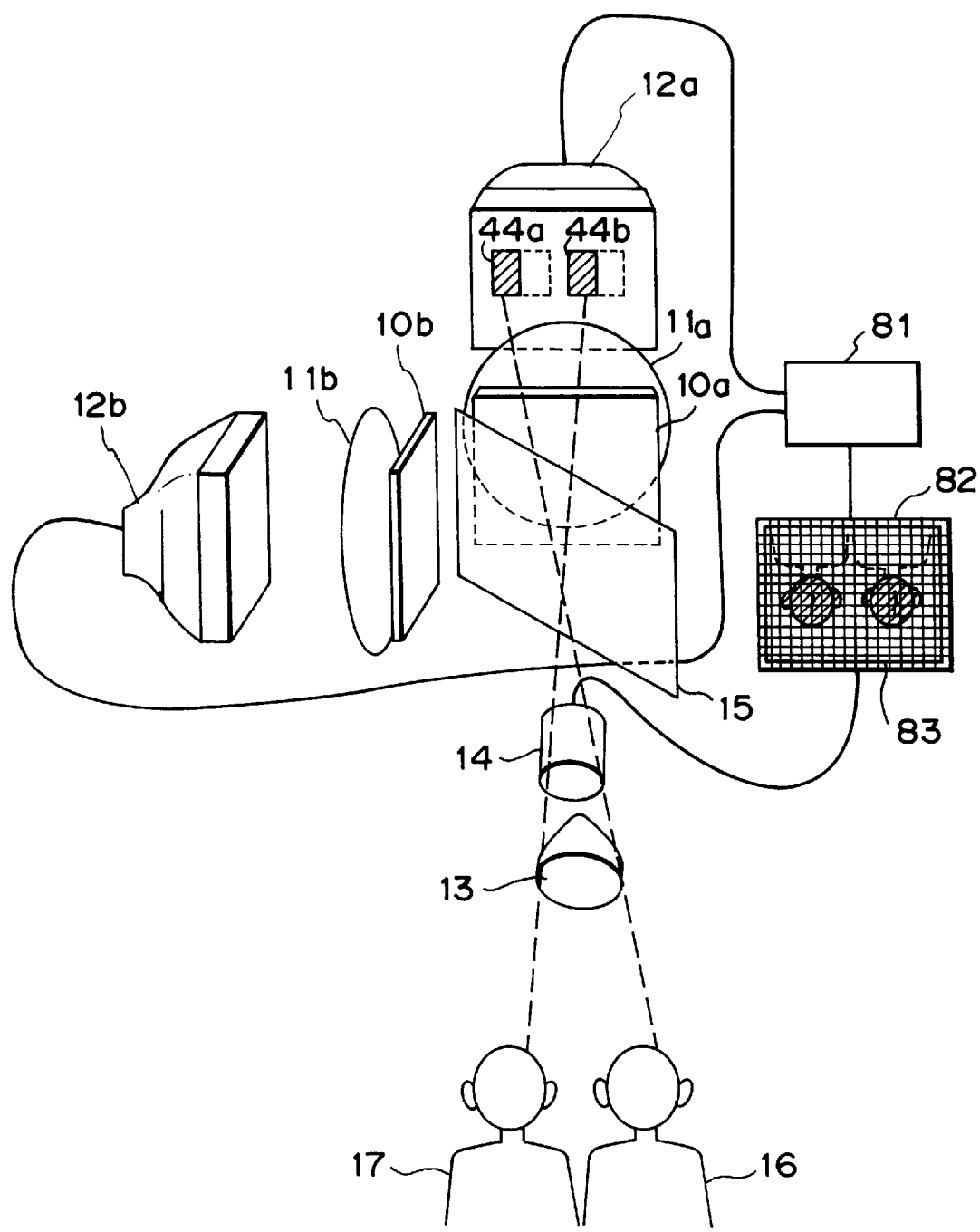
FIG. 18 is a schematic diagram illustrating the seventh embodiment of the stereoscopic-image display system according to the present invention.

FIG. 18 illustrates the construction of a seventh embodiment of a stereoscopic-image display system according to the present invention, including: transmission-type liquid crystal displays 10a and 10b serving as spatial modulation devices; Fresnel lenses 11a and 11b having a focal length of 150 mm disposed at back sides of spatial modulation devices 10a and 10b, respectively; black-and-white CRTs 12a and 12b serving as illuminating image display devices which emit light acting as illuminating light sources, wherein these black-and-white CRTs 12a and 12b are disposed opposite to spatial modulation devices 10a and 10b via lenses 11a and 11b at positions 160 mm far from lenses 11a and 11b; an LED light source 13 serving as an illuminating light source of wavelength of 850 nm; a black-and-white CCD camera 14 serving as a picture-taking apparatus; and a half mirror 15 for combining images displayed on the spatial modulation devices 10a and 10b into one image. In FIG. 18, there are also shown observers 16 and 17 who observe a stereoscopic image.

Furthermore, the system also includes: a black-and-white liquid crystal display 83 for displaying face images obtained via the black-and-white CCD camera 14; and a bright-point coordinate detector 82 for detecting pixels or bright points forming the image displayed on the black-and-white liquid crystal display 83. The detected position coordinates of the bright points are transferred to an image output device 81. These bright points act as measures indicating positions of observers and their face sizes. The image processing unit 81 determines face sizes of observers from the number of bright points detected by the detector 82, and determines right-eye images as well as left-eye images having sizes corresponding to the above face sizes. These images have been prepared beforehand and are stored in the image processing unit 81.

The image processing unit 81 calculates the positions of observers' faces from the position coordinates of bright points. When observers observe an image, their faces are usually in an upright stance. Taking this fact into account, the image processing unit 81 determines the center lines of faces from the distributions of the detected bright points. Then the image processing unit 81 displays the above-described images for right and left eyes on the screens of the CRTs 12a and 12b, respectively, at positions calculated in the above-described manner.

In FIG. 18, images 44a and 44b displayed on the black-and-white CRT 12a are such images determined by the image processing unit 81 from the images of the observers 16 and 17 according to the above-described process, wherein these images 44a and 44b act as back-lighting devices for illuminating an image viewed by right eyes of the observers 16 and 17.

On the other hand, images acting as back-lighting devices illuminating an image viewed by left eyes of the observers 16 and 17 are displayed in a mirror-image fashion on the black-and-white CRT 12b.

As described above, images acting as back-lighting devices for right and left eyes are produced by the image output device 81, and displayed on the black-and-white CRTs 12a and 12b at the positions corresponding to the position coordinates of the observers 16 and 17 detected by the bright-point coordinate detector 82. As for the light source and camera, the system of this seventh embodiment needs only one light source and one camera.

Application to Endoscope

Figure 19:
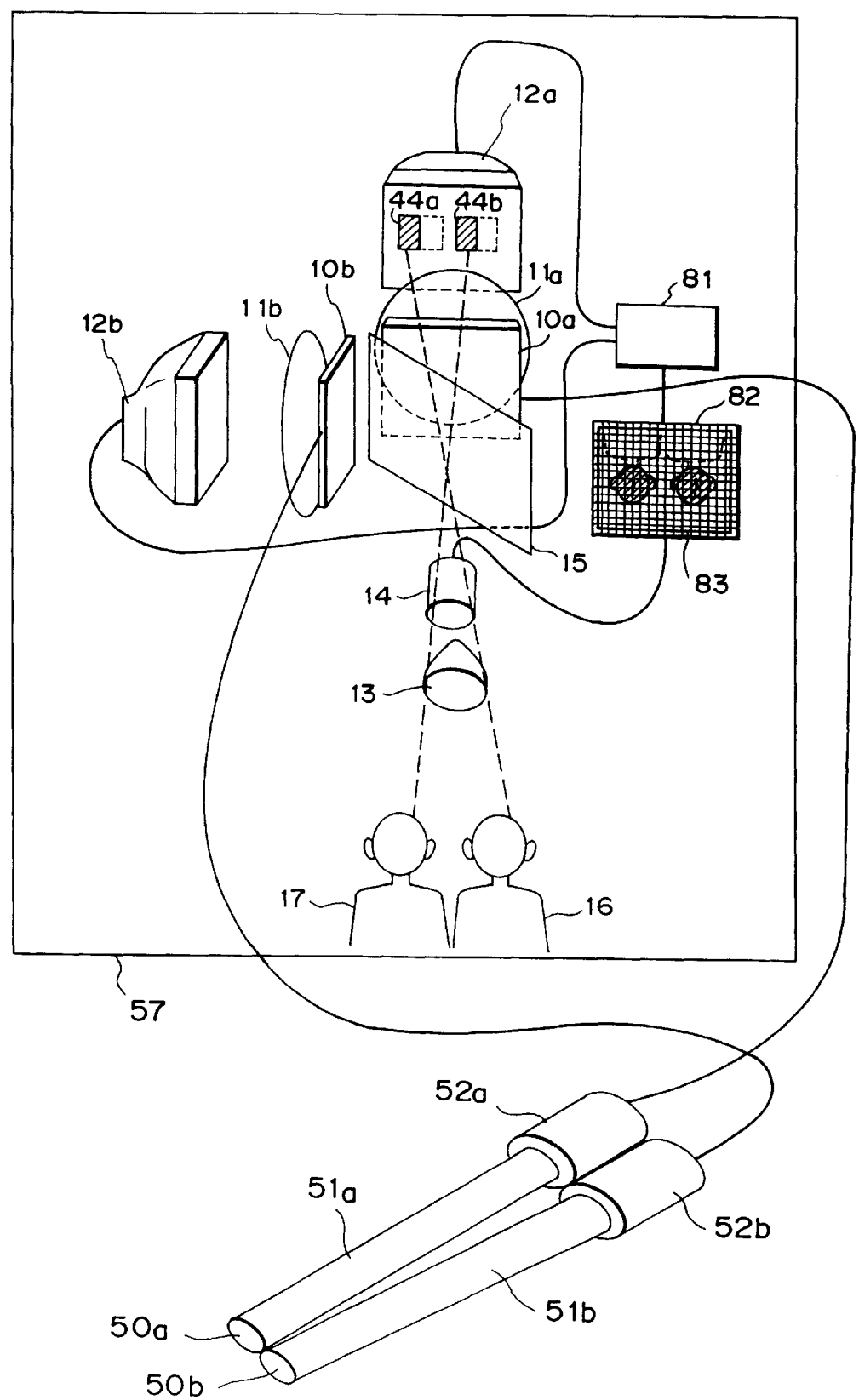
FIG. 19 is a schematic diagram illustrating an application of the seventh embodiment to an endoscope system.

FIG. 19 illustrates the construction of a system in which the seventh embodiment of the stereoscopic-image display system is applied to an endoscope. As shown in FIG. 19, the system includes: objective lenses 50a and 50b for taking pictures of an object; lens tubes 51a and 51b having optical systems for transmitting the above obtained images wherein these lens tubes 51a and 51b are disposed at an angle corresponding to a convergence angle of observer's eyes; and CCD cameras 52a and 52b; and a stereoscopic-image display system 57 of the seventh embodiment described above in connection with FIG. 18.

The endoscope system constructed in the above-described manner operates as follows. Two images of an object taken via objective lenses 50a and 50b are transmitted through lens tunes 51a and 51b having the convergence angle adjusted for stereoscopic vision so as to form an image for right eyes and an image for left eyes on CCD cameras 52a and 52b, respectively, thereby providing stereoscopic vision in the endoscope. The above-described two images are applied to liquid crystal displays 10a and lob, respectively, of the stereoscopic-image display system 53 and displayed on them as a pair of target images to provide stereoscopic vision associated with the image taken by the above endoscope to a large number of observers according to the functions of the stereoscopic-image display system 53 as described above in connection with the first embodiment.

Eighth Embodiment

In any of the first through seventh embodiments, the Fresnel lens 11 is separate from the liquid crystal display device 10. In contrast, in an eighth embodiment described below, a Fresnel lens and a liquid crystal display device are formed in an integral fashion thereby achieving a reduction in the system size.

Figure 20:
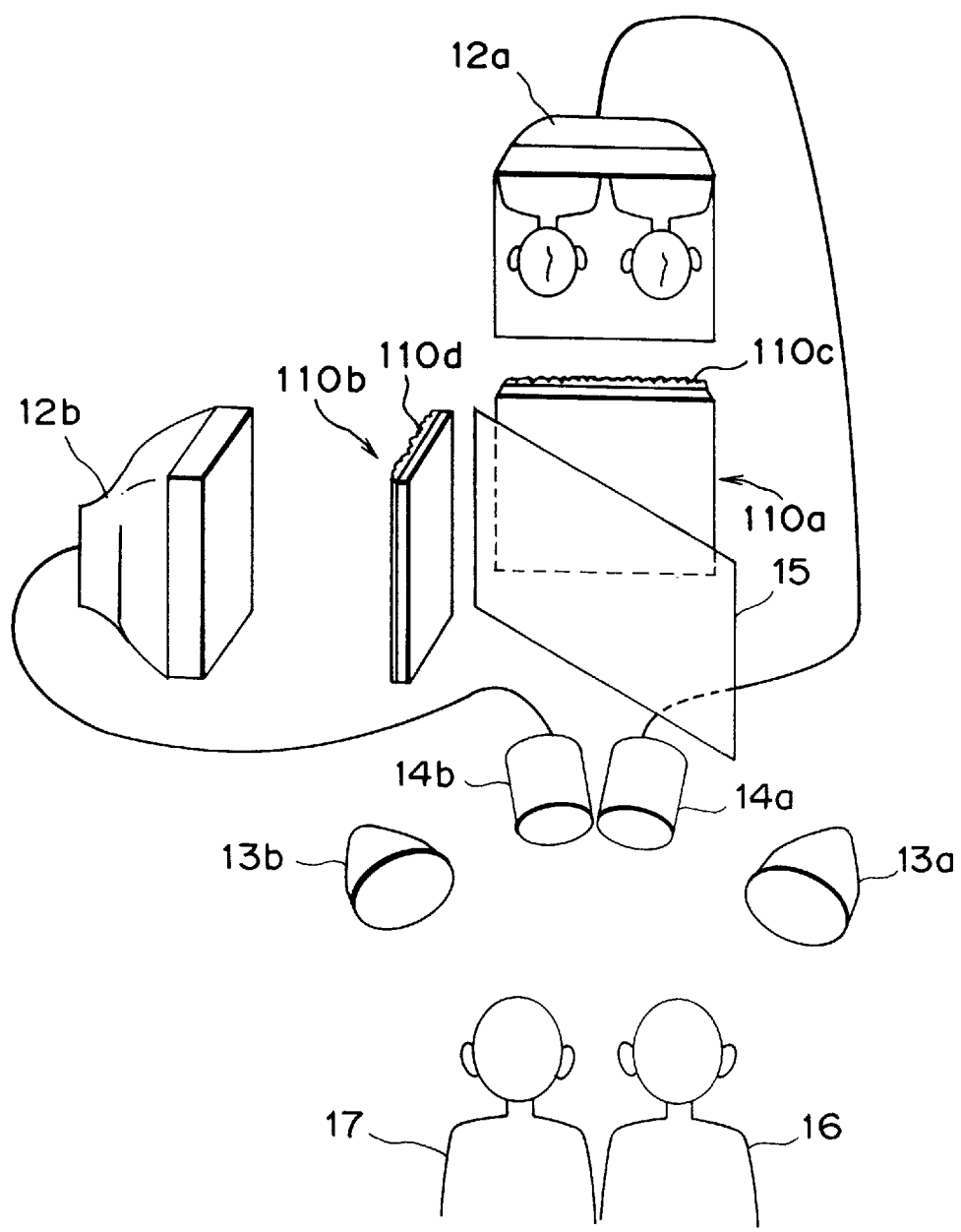
FIG. 20 is a schematic diagram illustrating an eighth embodiment of a stereoscopic-image display system according to the present invention.

Referring to FIG. 20, the eight embodiment of the present invention will be described below.

As shown in FIG. 20, the system has transmission-type liquid crystal displays 110a and 110b serving as spatial modulation devices. Fresnel lenses 110c and 110d are attached to the back faces of these liquid crystal displays 110a and 110b in an integral form. These Fresnel lenses 110c and 110d each have a focal length of 150 mm. The system further includes: black-and-white CRTs 12a and 12b serving as back-lighting devices for emitting light corresponding to images associated with observers, wherein the black-and-white CRTs 12a and 12b are each disposed opposite to the spatial modulation devices 110a and 10b via the Fresnel lenses 110c and 110d at positions 160 mm far from the Fresnel lenses 110c and 110d; LED light sources 13a and 13b serving as illuminating light sources which emit light having wavelengths 850 nm and 950 nm, respectively; black-and-white CCD cameras 14a and 14b serving as apparatus for taking pictures; and a half mirror 5 for combining images displayed on the liquid crystal displays 110a and 10b with Fresnel lenses into one image. In FIG. 8, there are also shown observers 16 and 17 who observe a stereoscopic image.

In the spatial modulation devices 110a and 10b, the Fresnel lenses attached to the back faces of the liquid crystal displays in an integral form may be replaced with Fresnel-patterned liquid crystal displays in which a circular zone Fresnel pattern is formed on a glass substrate on the back face of each transmission-type liquid crystal display.

Ninth Embodiment

Figure 21:
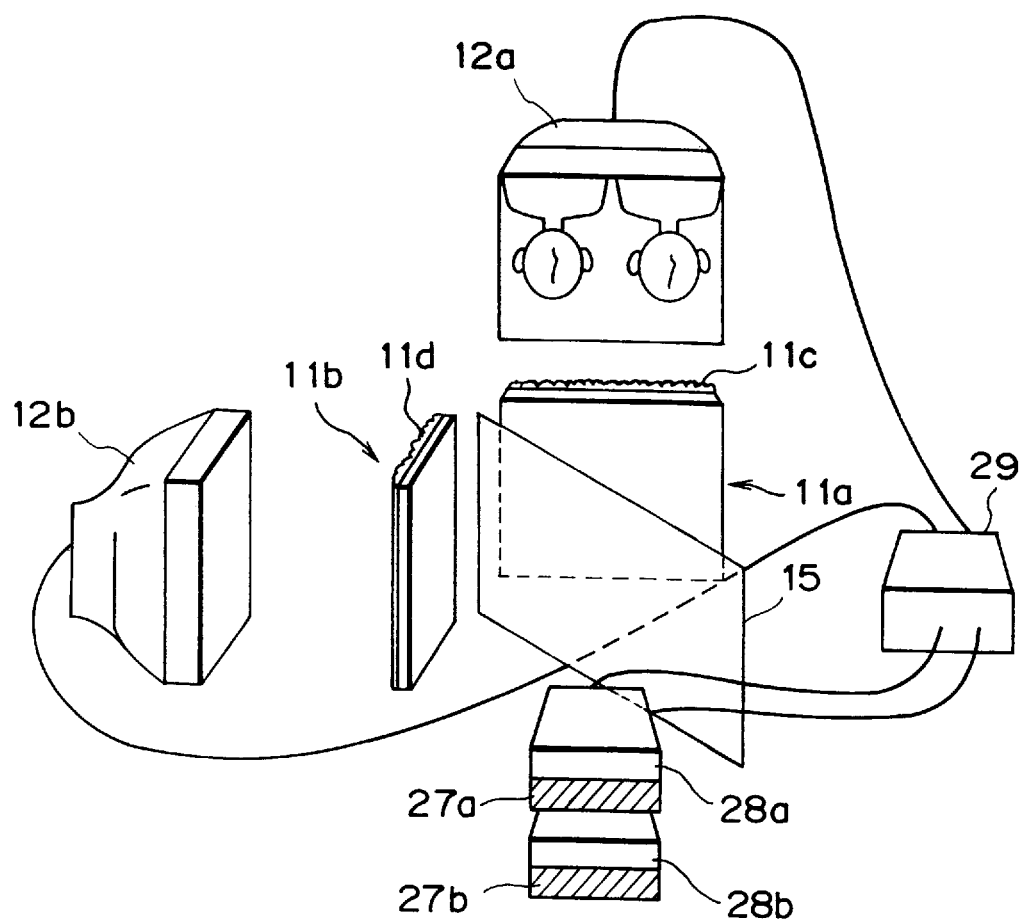
FIG. 21 is a schematic diagram illustrating an ninth embodiment of a stereoscopic-image display system according to the present invention.

FIG. 21 illustrates the construction of a ninth embodiment of a stereoscopic-image display system. In this ninth embodiment, composite display devices each composed of a Fresnel lens and a liquid crystal are also used as in the eighth embodiment. However, this ninth embodiment differs from the eighth embodiment in that positions of observers are detected using ultrasonic waves. As shown in FIG. 21, the system includes: ultrasonic wave generators 27a and 27b for generating ultrasonic waves having frequencies of 100 kHz and 120 kHz, respectively, toward observers 16 and 17; ultrasonic wave detectors 28a and 28b for detecting ultrasonic waves generated by the ultrasonic wave generators wherein the ultrasonic wave detector 28a selectively detects an ultrasonic wave having a frequency corresponding to that of the ultrasonic wave generator 27a, and the ultrasonic wave detector 28b selectively detects an ultrasonic wave having a frequency corresponding to that of the ultrasonic wave generator 27b; and an ultrasonic waves image output device 29.

In ninth embodiment, two ultrasonic waves having different wavelengths generated by the ultrasonic wave generators 27a and 27b are reflected from two observers, and detected by the ultrasonic wave detectors 28a and 28b, respectively. From the detected signals, the ultrasonic wave image output device 29 calculates the positions of images corresponding to right-side and left-side face areas of the observers to be displayed on the black-and-white CRTs 12a and 12b, and then outputs predetermined images for right-side faces and images for left-side faces to the black-and-white CRTs 12a and 12b, respectively, so as to display these images on the black-and-white CRTs 12a and 12b. In this processing, it is easy to display only images corresponding to observers' faces on the black-and-white CRTs 12a and 12b and display nothing other than those images. Therefore, it is possible to prevent crosstalk between right and left images in which the left eye (right eye) gets weak perception of the right-eye (left-eye) image due to disturbance in light.

Application to Endoscope

FIG. 22 illustrates the construction of a system in which the eighth embodiment of the stereoscopic-image display system is applied to an endoscope. As shown in FIG. 22, the system includes: objective lenses 50a and 50b for taking pictures of an object; lens tubes 51a and 51b having optical systems for transmitting the above obtained images wherein these lens tubes 51a and 51b are disposed at an angle corresponding to a convergence angle of observer's eyes; and CCD cameras 52a and 52b; and a stereoscopic-image display system 56 according to the eighth embodiment.

The endoscope system constructed in the above-described manner operates as follows. Two images of an object taken via objective lenses 50a and 50b are transmitted through lens tunes 51a and 51b having the convergence angle adjusted for stereoscopic vision so as to form an image for right eyes and an image for left eyes on CCD cameras 52a and 52b, respectively, thereby providing stereoscopic vision in the endoscope. The above-described two images are applied to liquid crystal displays 10a and 10b, respectively, of the stereoscopic-image display system 53 and displayed on them as a pair of target images to provide stereoscopic vision associated with the image taken by the above endoscope to a large number of observers according to the functions of the stereoscopic-image display system 53 as described above in connection with the first embodiment.

Construction of a Composite Display Device

Many variations of a combination of a liquid crystal device and a Fresnel lens are possible. Some examples of such variations will be described below.

Figure 23A:
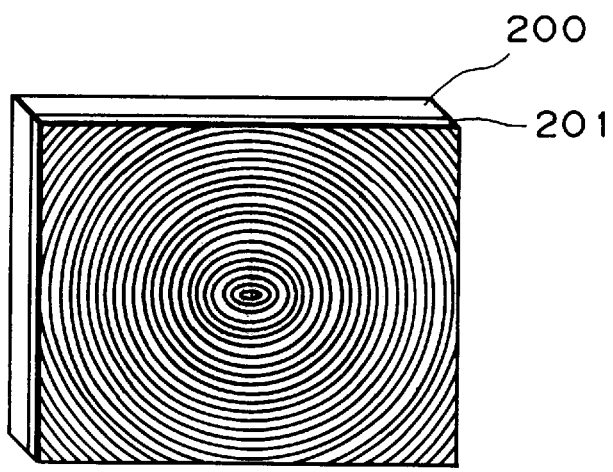
FIGS. 23A and 23B are schematic diagrams illustrating an example of an element used in the eighth and ninth embodiments.
Figure 23B:
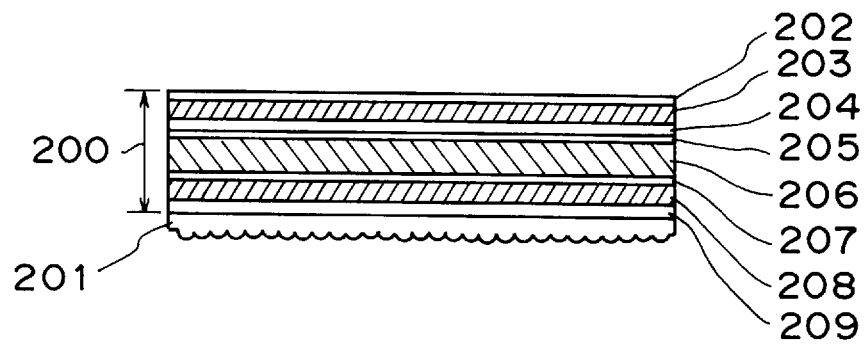

FIG. 23A is a perspective view illustrating the entire appearance of a display device comprising a liquid crystal device 200 and a Fresnel lens 201 looking like circular bands wherein the Fresnel lens 201 is bonded to the liquid crystal device 200. FIG. 23B is a cross-sectional view illustrating the structure of the display device in which the Fresnel lens 201 is bonded to the back face of the liquid crystal device 200.

As shown in FIG. 23B, polarizing filters 202 and 209 for polarizing light are disposed at the most outer sides of the liquid crystal device 200 so that optical properties of the liquid crystal can be used in conjunction with the polarizing filters 202 and 209. Glass substrates 203 and 208 for encapsulating the liquid crystal are disposed inside the polarizing filters 202 and 209. Inside the glass substrates, a color filter 204 is disposed as required. At further inner positions, transparent electrodes 205 and 207 for applying a required electric field to the liquid crystal are disposed wherein the liquid crystal 206 is disposed between these transparent electrodes 205 and 206. If a Fresnel lens 201 is bonded to the liquid crystal device 200 constructed in the above-described manner, then a structure whose cross section is shown in FIG. 23B is obtained.

In this structure in which the Fresnel lens 201 is bonded to the back face of the liquid crystal device 200, the space and holder required for installing the lens become unnecessary. Furthermore, this structure leads to a reduction in the total system size.

Figure 24A:
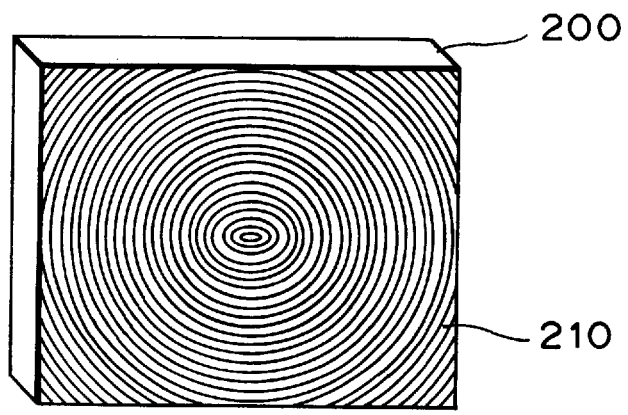
FIGS. 24A and 24B are schematic diagrams illustrating a modified example of the element shown in FIGS. 23A and 23B.
Figure 24B:
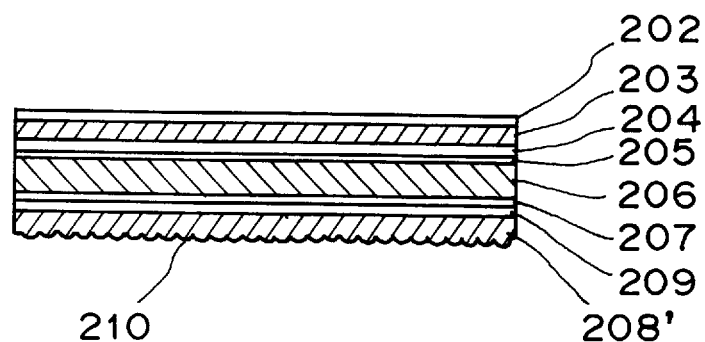

FIG. 24A illustrates another example in which a circular band pattern similar to that shown in FIG. 23A is formed in an integral fashion on a glass substrate disposed at the most outer position. As shown in FIG. 24B, this liquid crystal device also has polarizing filters 202 and 209 for polarizing light such that optical properties of the liquid crystal can be used in conjunction with the polarizing filters 202 and 209. However, as for the side on which the circular band pattern is formed, the glass substrate 208 is disposed at the most outer position, and the polarizing filter 209 is disposed next to the glass substrate 208'. Therefore, one of two glass substrates used to encapsulate the liquid crystal is disposed next to the most outer layer. At further inner positions, transparent electrodes 205 and 206 for applying a required electric field to the liquid crystal are disposed wherein the liquid crystal 206 is disposed between these transparent electrodes 205 and 206. A Fresnel lens 201 is bonded to the liquid crystal device 200 constructed in the above-described manner, and thus a structure whose cross section is shown in FIG. 24B is complete.

The circular band pattern can be formed by performing etching directly on a glass plate, or by forming a pattern in a resin layer coated on the outer resin surface of the liquid crystal by means of compression-pattern-transferring.

Modifications of Back-Lighting Devices

Figure 25:
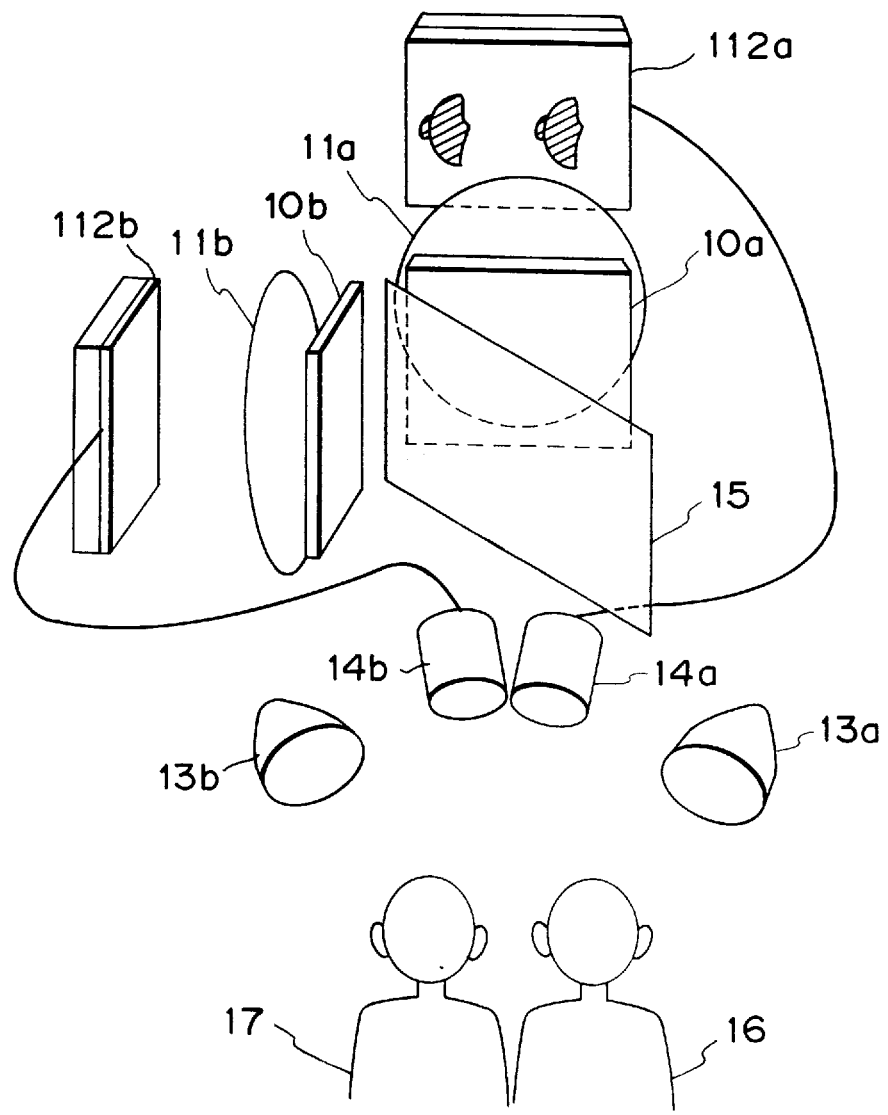
FIG. 25 is a schematic diagram illustrating a display system in which back-lighting devices capable of displaying two-level back-light images are used.

FIG. 25 illustrates the construction of a stereoscopic-image display system in which a modified back-lighting device is used.

As shown in FIG. 25, the system includes: transmission-type liquid crystal displays 10a and 10b serving as spatial modulation devices; Fresnel lenses 11a and 11b having a focal length of 150 mm disposed at the back of spatial modulation devices 10a and 10b, respectively; black-and-white CRTs 12a and 12b serving as back-lighting devices capable of displaying images with two-level gradation, wherein these black-and-white CRTs 12a and 12b are disposed opposite to the spatial modulation devices 10a and 10b via lenses 11a and 11b at positions 160 mm far from lenses 11a and 11b; LED light sources 13a and 13b serving as illuminating light sources which emit light having wavelengths 850 nm and 950 nm, respectively; black-and-white CCD cameras 14a and 14b serving as apparatus for taking pictures; and a half mirror 15 for combining images displayed on the spatial modulation devices 10a and 10b into one image. In FIG. 25, there are also shown observers 16 and 17 who observe a stereoscopic image.

The stereoscopic-image display system having the above-described construction operates in basically the same manner as in previous embodiments except that the black-and-white CRT 12 serving as the observer's-image display device is replaced with the black-and-white liquid crystal display of two-level gradation type.

Figures 26A, 26B:
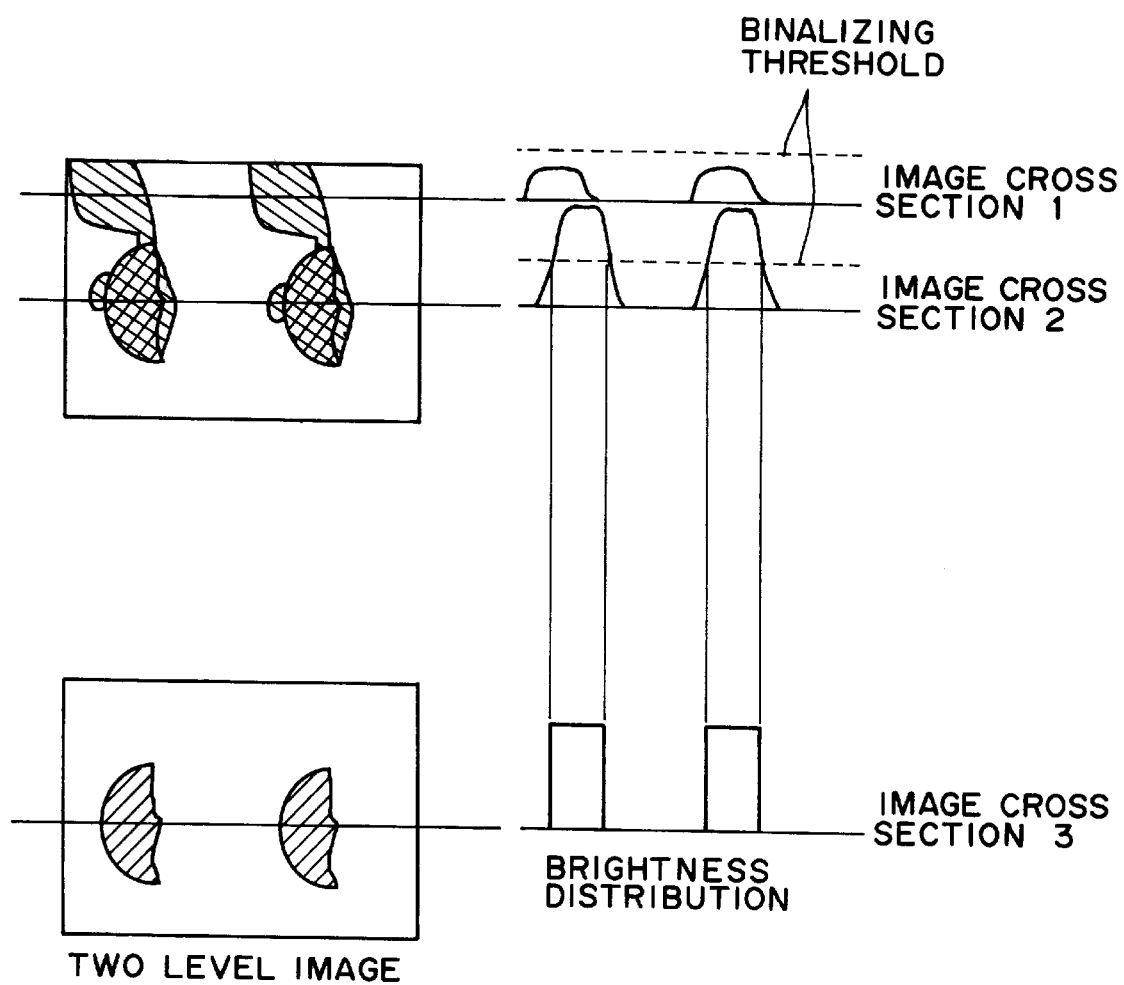
FIGS. 26A and 26B are schematic diagram illustrating advantages of the back-lighting devices capable of displaying two-level back-light images.

Referring to FIGS. 26A and 26B, two-level value representation of an image will be described below.

Two-level gradation black-and-white liquid crystal displays 112a and 112b are each provide with a high-brightness back-lighting device which is always lighted wherein light emitted from the back-lighting device is passed through or blocked off by a liquid crystal shutter. A fluorescent lamp, metal halide lamp, or the like can be used here as the back-lighting device.

In the case of multilevel gradation display systems such as the black-and-white CRT 12 used in the previous embodiments, images of portions other than a half-face area are also displayed as shown n FIG. 26A. In the present invention, however, it is undesirable that images other than a half-face area are displayed as a back-lighting device.

In contrast, when a two-level gradation black-and-white liquid crystal display is used, images having brightness levels less than a predetermined threshold level are automatically cut off and not displayed. Thus, the portions having the cross sections denoted by "Image Cross Section 1" in FIG. 26A are not displayed. As for the portions having the cross sections denoted by "Image Cross Section 2", their peripheral areas are cut out and images having cross sections denoted by "Image Cross Section 3" in FIG. 26B are displayed. As can be seen from the above discussion, if a two-level gradation black-and-white liquid crystal display is used as the observer's-image display device instead of the black-and-white CRT, displaying of two-level face images are easily achieved and thus only high-brightness portions of half-face areas which are essential as back-lighting devices are selectively displayed whereby crosstalk between right and left images is suppressed.

Further Modifications

In the embodiments described above in connection with FIGS. 3 through 26, observers' positions are detected using infrared light rays having different wavelengths (or ultrasonic waves having different frequencies), and corresponding images for left eyes are formed. For the above purpose, a pair of infrared LED light sources (13a, 13b), a pair of cameras (14a, 14b), and a pair of ultrasonic wave generators and detectors. Alternatively, infrared light rays having different wavelengths (or ultrasonic waves different frequencies) may be emitted at different times using only one infrared LED light source or one ultrasonic wave generator.

Furthermore, the half mirror 15 for synthesizing images may be replaced with prism system, and Fresnel lenses 11a, 11b may be replaced with concave mirrors.

The present invention is not limited to the above embodiments and various changes and modifications can be made within the spirit and scope of the present invention. Therefore, to appraise the public of the scope of the present invention, the following claims are made.

What is claimed is:

1. An image display system for providing images such that the right eye and the left eye of an observer see different images, respectively, said image display system comprising:
a pair of spatial modulation devices transparent to light;
a pair of back-lighting devices for displaying back-light images in order to illuminate said pair of spatial modulation devices from their back sides;
composing means for combining images present on said pair of spatial modulation devices into one image; and
optical elements for giving directivity to back-light emitted by said pair of back-lighting devices so that one of said pair of back-lighting devices provides back-light illumination of said spatial modulation device for the right eye and the other one of said pair of back-lighting devices provides back-light illumination of said spatial modulation device for the left eye.

2. A display system according to claim 1, wherein said pair of back-lighting devices are disposed outside the focal length of said optical elements.

3. A display system according to claim 2, wherein said optical elements are a pair of lenses disposed between said pair of spatial modulation devices and said pair of back-lighting devices, respectively.

4. A display system according to claim 3, wherein said pair of optical elements are convex lenses, concave mirrors or Fresnel lenses.

5. A display system according to claim 1, wherein said pair of spatial modulation devices are a pair of liquid crystal display devices.

6. A display system according to claim 1, wherein said pair of spatial modulation devices are a pair of films transparent to light.

7. A display system according to claim 1, wherein:
each of said pair of spatial modulation devices inputs an image signal provided by an endoscope device; and
said endoscope device includes:
a pair of lens tubes for transmitting images of an object to be observed as stereoscopic vision, said images of the object being taken at two different viewing angles; and
a pair of image sensing devices for converting the pair of obtained images to corresponding electric signals.

8. A display system according to claim 1, wherein said pair of optical elements are Fresnel lenses each formed on the back surface of each of said pair of spatial modulation devices in an integral fashion.

9. A display system according to claim 1, wherein said pair of back-lighting devices are display devices which display images with two-level gradation having a threshold value equal to predetermined brightness.

10. An image display system for providing images such that a right eye and a left eye of an observer see different images, respectively, said image display system comprising:
position detecting means for detecting an observing position of said observer;
a pair of spatial modulation devices transparent to light;
a pair of back-lighting devices which display back-light images for illuminating said pair of spatial modulation devices from their back sides;
control means for controlling positions of back-light images displayed on said pair of back-lighting devices so that said positions of back-light images correspond to the detected position of the observer;
composing means for combining images present on said pair of spatial modulation devices into one image; and
optical elements for giving directivity to back-light emitted by said pair of back-lighting devices so that one of said pair of back-lighting devices provides back-light illumination of said spatial modulation device for the right eye and the other one of said pair of back-lighting devices provides back-light illumination of said spatial modulation device for the left eye.

11. A display system according to claim 10, wherein said position detecting means includes:
a pair of ultrasonic wave generators;
a pair of ultrasonic wave detectors for selectively receiving respective echo signals associated with said pair of ultrasonic wave generators;
means for detecting positions of left-side face area and right-side face area of the observer from respective echo signals detected by said pair of ultrasonic wave detector, and further outputting the detected positions to said control means.

12. A display system according to claim 10, wherein said position detecting means detects the position of the observer by detecting an infrared ray radiated by the observer.

13. A display system according to claim 10, wherein said position detecting means detects the position of the observer by detecting magnetism arising from the observer.

14. A display system according to claim 10, wherein said pair of optical elements are Fresnel lenses each formed on the back surface of each of said pair of spatial modulation devices in an integral fashion.

15. A display system according to claim 10, wherein said pair of back-lighting devices are display devices which display images with two-level gradation having a threshold value equal to predetermined brightness.

16. An image display system for providing images such that a right eye and a left eye of an observer see different images, respectively, said image display system comprising:
picture-taking means for taking a picture of said observer and then outputting an image of the observer;
a pair of spatial modulation devices transparent to light;
back-light image generation means for generating a back-light image based on an image output signal received from said picture-taking means;
a pair of back-lighting devices which receive an output signal associated with the back-light image generated by said back-light image generation means and displays said back-light image to illuminate said pair of spatial modulation devices from their back sides;
composing means for combining images present on said pair of spatial modulation devices into one image; and
optical elements for giving directivity to back-light emitted by said pair of back-lighting devices so that one of said pair of back-lighting devices provides back-light illumination of said spatial modulation device for the right eye and the other one of said pair of back-lighting devices provides back-light illumination of said spatial modulation device for the left eye.

17. A display system according to claim 16, wherein said back-light image generation means generates a back-light image corresponding to the image of the observer's face taken by said picture-taking means.

18. A display system according to claim 16, wherein said picture-taking means separates an image of a left-side face area and an image of right-side face area from said image of the observer's face, and then displays the image of the left-side face area and the image of right-side face area on said pair of back-lighting devices, respectively.

19. A display system according to claim 16, wherein said picture-taking means includes:

a pair of illuminating devices for illuminating an observer face in such a manner that a right-side face area and a left-side face area are illuminated with light having different wavelengths;

a pair of cameras for taking a picture of said observer's face in such a manner that each said camera selectively takes a picture in response to light having a corresponding wavelength.

20. A display system according to claim 19, further comprising:

image processing means for determining the difference between a pair of image signals associated with the observer obtained via said pair of cameras, and further removing a background image from said pair of image signals on the basis of said difference.

21. A display system according to claim 19, wherein said pair of illuminating devices are fixed to the observer so that said pair of illuminating devices move following the movement of the head of the observer.

22. A display system according to claim 19, wherein said pair of cameras are each provided with a wavelength filter which selectively passes light emitted by said pair of illuminating devices.

23. A display system according to claim 16, further comprising:

image processing means for processing the image of the observer taken by said picture-taking means in such a manner that the contour and/or the centroid of the face area of the image of the observer are detected and then said pair of back-light images are generated on the basis of said detected contour and/or centroid.

24. A display system according to claim 16, wherein said picture-taking means includes:

a plurality of camera means having different sensitivity characteristics; and a plurality of illumination means having characteristics corresponding to the sensitivity characteristics of said plurality of camera means.

25. A display system according to claim 24, wherein said plurality of illumination means and said plurality of camera means are distributed in the direction from the left to the right as well as in the direction from the front to the back of said plurality of observers.

26. A display system according to claim 16, further comprising:

image processing means for processing the image of the observer taken by said picture-taking means in such a manner that the image of the observer is displayed as illuminated portions and the positions of bright points associated with the illuminated portions are detected and then said pair of back-light images are generated on the basis of said detected positions of bright points.

27. A display system according to claim 16, wherein said pair of optical elements are Fresnel lenses each formed on the back surface of each of said pair of spatial modulation devices in an integral fashion.

28. A display system according to claim 16, wherein said pair of back-lighting devices are display devices which display images with two-level gradation having a threshold value equal to predetermined brightness.

* * * * *

UNITED STATES PATENT AND TRADEMARK OFFICE
CERTIFICATE OF CORRECTION

PATENT NO. : 5,774,261
DATED : June 30, 1998
INVENTOR(S) : Shigeru OMORI et al.

It is certified that error appears in the above-identified patent and that said Letters Patent is hereby corrected as shown below:

TITLE PAGE:
In Section [56], kindly delete "63-12777" and insert -- 63-127777 --.
In Column 16, line 31, delete "Sob" and insert -- 50b --.
In Column 16, line 50, delete "lob" and insert -- 10b --.
In Column 19, line 25, delete "lob" and insert -- 10b --.
In Column 19, line 51, delete "10b" and insert -- 110b --.
In Column 19, line 59, delete "10b" and insert -- 110b --.
In Column 19, line 62, delete "10b" and insert -- 110b --.

Signed and Sealed this

Twenty-fourth Day of November, 1998

Attest:

BRUCE LEHMAN

Attesting Officer

Commissioner of Patents and Trademarks